(12) United States Patent
Lopes

(10) Patent No.: US 8,332,286 B1
(45) Date of Patent: Dec. 11, 2012

(54) ACCOUNTING ACCURACY METHODOLOGY

(76) Inventor: Ricardo A. Georg Lopes, Aventura, FL (US)

(*) Notice: Subject to any disclaimer, the term of this patent is extended or adjusted under 35 U.S.C. 154(b) by 399 days.

(21) Appl. No.: 12/430,450

(22) Filed: Apr. 27, 2009

Related U.S. Application Data

(63) Continuation-in-part of application No. 11/836,385, filed on Aug. 9, 2007, now abandoned.

(51) Int. Cl.
*G07B 17/705* (2006.01)
(52) U.S. Cl. .......................................... 705/30; 705/68
(58) Field of Classification Search .................. 705/30
See application file for complete search history.

(56) References Cited

U.S. PATENT DOCUMENTS

| | | | | |
|---|---|---|---|---|
| 5,783,808 A * | 7/1998 | Josephson | ..................... | 235/379 |
| 6,301,379 B1 * | 10/2001 | Thompson et al. | ........... | 382/137 |
| 6,684,384 B1 * | 1/2004 | Bickerton et al. | ............ | 717/108 |
| 7,340,421 B1 * | 3/2008 | Marcial et al. | ................... | 705/30 |
| 2003/0204456 A1 * | 10/2003 | Engdahl et al. | ................. | 705/30 |
| 2004/0030621 A1 * | 2/2004 | Cobb | ............................... | 705/35 |
| 2005/0044015 A1 * | 2/2005 | Bracken et al. | ................. | 705/30 |
| 2005/0222929 A1 * | 10/2005 | Steier et al. | ..................... | 705/35 |
| 2007/0100749 A1 * | 5/2007 | Bachu et al. | .................... | 705/42 |
| 2007/0130066 A1 * | 6/2007 | Soumokil | ....................... | 705/40 |
| 2008/0140473 A1 * | 6/2008 | Taylor | ............................... | 705/7 |

* cited by examiner

*Primary Examiner* — Scott Zare
*Assistant Examiner* — Talia Crawley
(74) *Attorney, Agent, or Firm* — Malin Haley DiMaggio Bowen & Lhota, P.A.

(57) ABSTRACT

The present invention relates to a system and method for a comprehensive account reconciliation process, which ensures a predictable level for the accuracy of the ledger account balance. The present account reconciliation process includes nine reconciliation methods both transactional and non-transactional. The account reconciliation processes are part of overall accounting accuracy methodology that includes five macro processes where reconciliation takes place during the execute macro process. The reconciliation methods cover the diverse interactions between the ledger accounts and supporting documents that are either externally or internally generated.

10 Claims, 10 Drawing Sheets

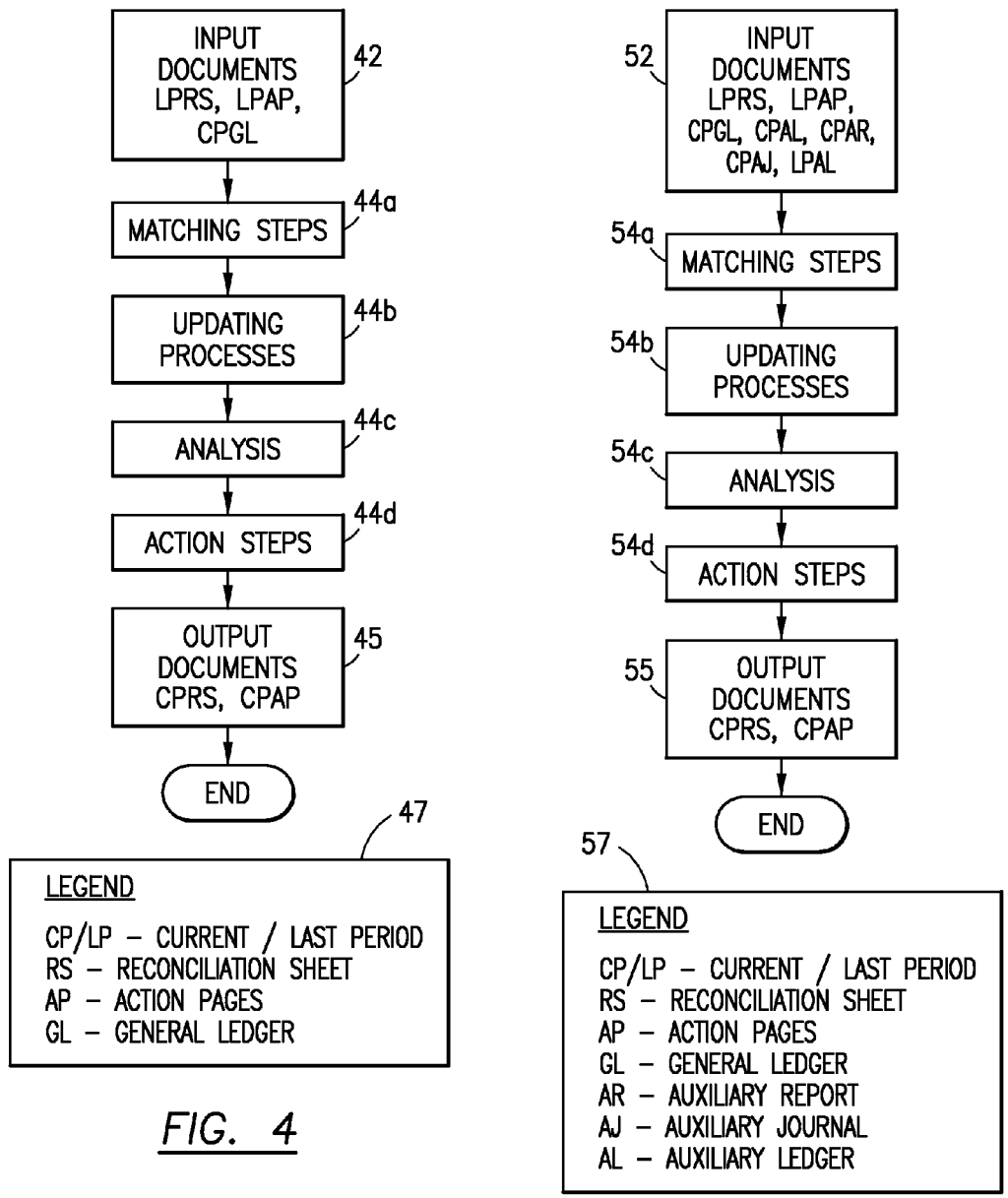

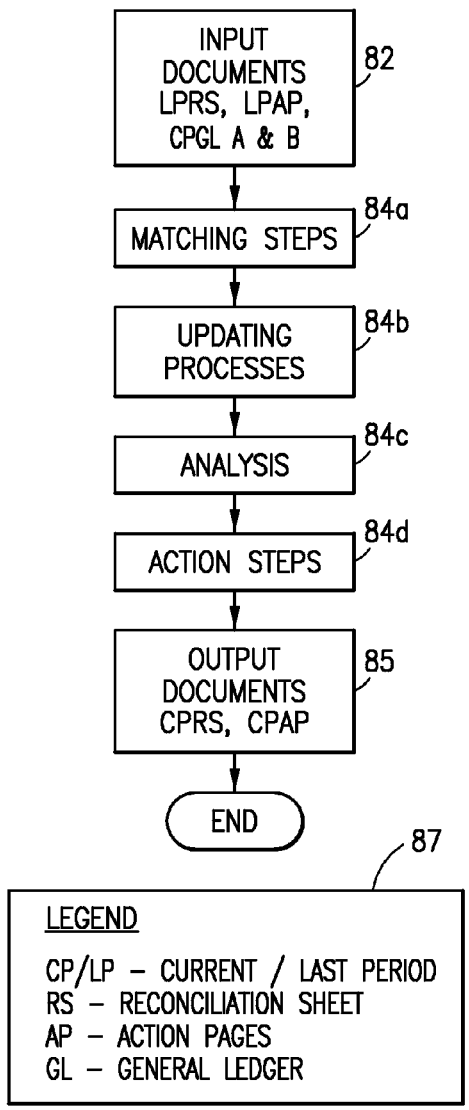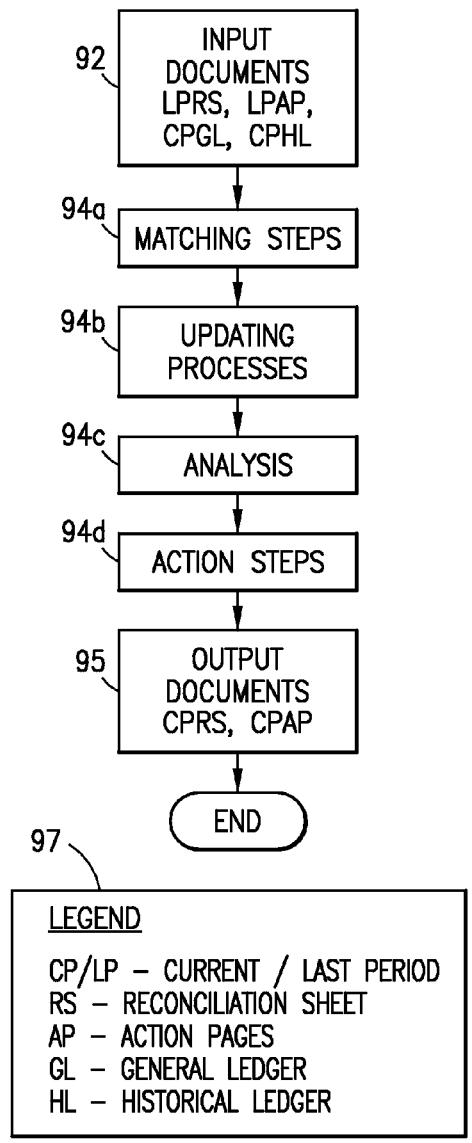
FIG. 8
FIG. 9

ACCOUNTING ACCURACY METHODOLOGY

This application is a continuation-in-part of U.S. patent application Ser. No. 11/836,385 filed on Aug. 9, 2007 now abandoned

BACKGROUND OF THE INVENTION

1. Field of the Invention

The present invention relates to a computer program product, comprising a computer usable medium having a computer readable program code embodied therein, said computer readable program code adapted to be executed to implement a method that enhances accuracy in enterprise accounting by performing account analysis through a determining the accuracy of ledger accounts and measuring of financial statement accuracy using novel accounting reconciliation methods.

2. Description of Related Art

Account reconciliation is an accounting process utilized to verify the accuracy of a ledger account balance and its accounting entries. Account reconciliation involves a post-fact inspection process because the accounting events have already happened. Account reconciliation enables the finance area to manage any outstanding items. The outstanding items are accounting entries that currently compose the ledger account balance. In order to control the outstanding items, account reconciliation uses a reconciliation sheet to provide a detailed analysis of all accounting entries that are part of a ledger account. The process follows with corrective actions for the inconsistencies detected by the detailed analysis and it circles back to the detailed analysis to verify the completion of the corrective actions and if there are remaining inconsistencies.

Accounting entries affect the ledger account balance through the posting process, which is the only accounting mechanism that is entitled to do so. Therefore, the accuracy of a ledger account has a direct relationship to the accuracy of its outstanding items, which are the accounting entries that compose its balance. An accounting transaction to be conclusive and accurately registered in a ledger account must comply with the following key attributes. If any of these attributes do not stay, the accounting transaction is neither conclusive nor accurate.

Belonging
Unequivocal identification
Atomicity
No Sharable

SUMMARY OF THE INVENTION

The present invention relates to a computer program product, comprising a computer usable medium having a computer readable program code embodied therein, said computer readable program code adapted to be executed to implement a method that enhances accuracy in enterprise accounting by performing account analysis. The invention provides for a comprehensive account reconciliation process that ensures a predictable level for the accuracy of the ledger account balance. Nine reconciliation methods can be executed through the software program. The reconciliation methods cover the diverse interactions between the ledger accounts and supporting documents that are either externally or internally generated.

Key Features of the Present Invention Include:
  Transactional reconciliation methods
  Non-transactional reconciliation methods
  High level flow diagrams for each reconciliation method
  Individualized matching mechanisms by reconciliation method
  Reconciliation Control Reports
  Action Pages for Outstanding items
  Well-defined roles and responsibilities
  Management Reporting process
  Results & in-process metrics
  Assessment of resources to deliver in a timely manner
Key Accomplishments Achieved by the Present Invention Include:
  General Ledger Balance Accuracy
  Predictable outcome/accomplishment
  Progressive reduction of outstanding items
  High Level and detailed monitoring
  Broader acceptance of Performance metrics
  Write off visibility and proper Approval
  Assigned Accountability
Customization The accounting accuracy methodology has components that are flexible enough for customization for a better fit of available resources, company complexity, and internal control requirements. The user dictates the actual methodology usage and may customize it accordingly to ensure that documentation remains clear, well communicated, and followed. It is possible to combine and split reconciliation documents, only if there is a clear understanding and acceptance of the trade off between workload vs. accuracy/visibility. Quantity and quality of currently available resources, and a potential staff hiring, are factors to consider for the customization. The matching mechanism of each reconciliation method does not require customization, because it is precisely tailored to understand root causes and timely solutions.

In accordance with these and other objects, which will become apparent hereinafter, the instant invention will now be described with particular reference to the accompanying drawings.

BRIEF DESCRIPTION OF THE DRAWINGS

FIG. 4 shows a graphical representation of the stand alone reconciliation method according to the present invention.

FIG. 5 shows a graphical representation of the auxiliary ledger reconciliation method according to the present invention.

FIG. 8 shows a graphical representation of the intercompany reconciliation method according to the present invention.

FIG. 9 shows a graphical representation of the equity reconciliation method according to the present invention.

DETAILED DESCRIPTION

Figure 1:
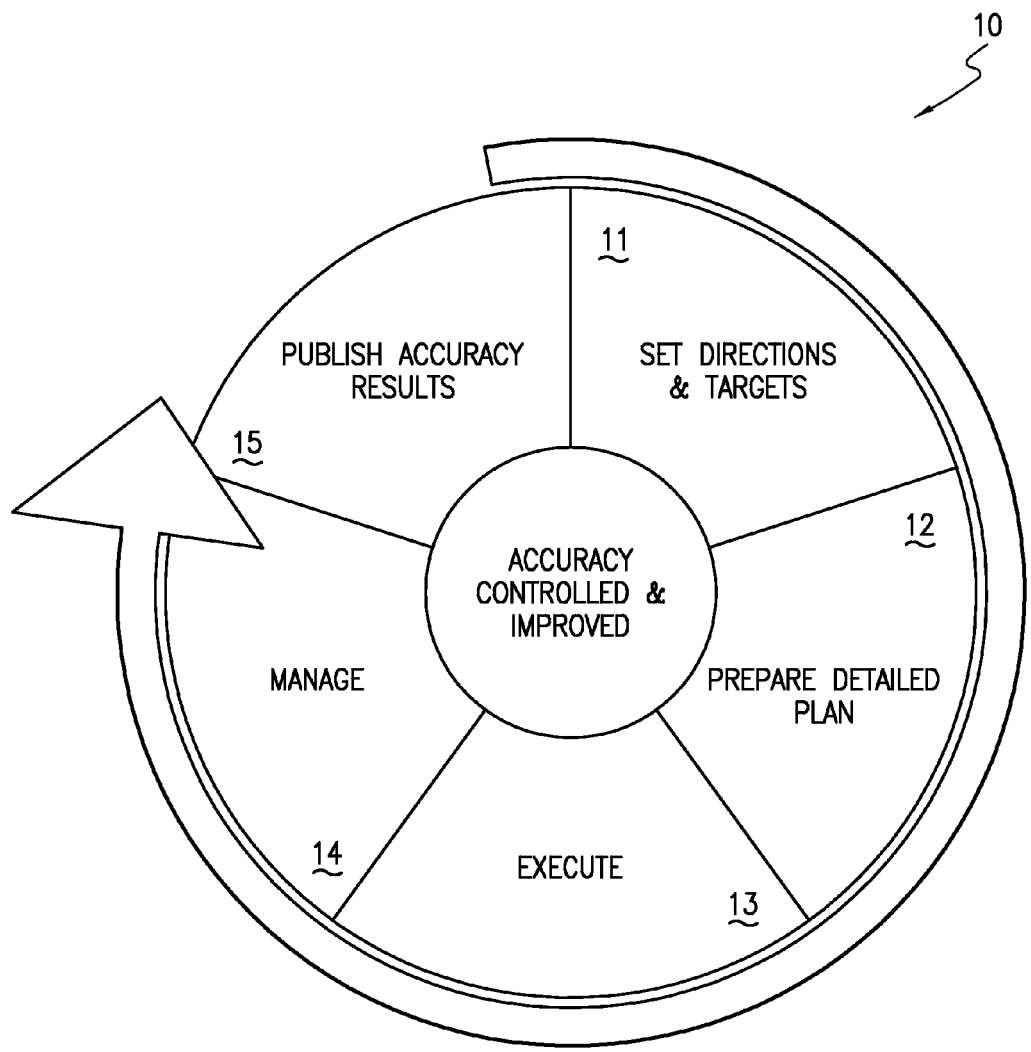
FIG. 1 shows a graphical depiction of the macro-processes according to the present invention.

The present invention is embodied in an accounting accuracy methodology that contains five macro processes: 1) Set Directions & Targets; 2) Prepare Detailed Plan; 3) Execute; 4) Manage; and 5) Publish Accuracy Results. The methodology also provides a one-off macro process named Start up for its deployment. FIG. 1 shows a graphical depiction of the macro-processes according to the present invention. As shown, a set of directions and targets for the company are periodically established, normally annually, based on the history of accomplishments and the desired state for accounting accuracy. If the variations against targets are material enough, then a shorter period may be incorporated such as once a quarter.

Next a detailed plan 12 is developed including at least the following components: 1) quantity of companies and revenue size; 2) quantity of ledger accounts and total balance; 3) current status of account reconciliation (measured by any existing metrics); 4) assessment of necessary resources to execute the reconciliation process; and 5) estimate of technology budget for equipment, software, and support.

Figure 2:
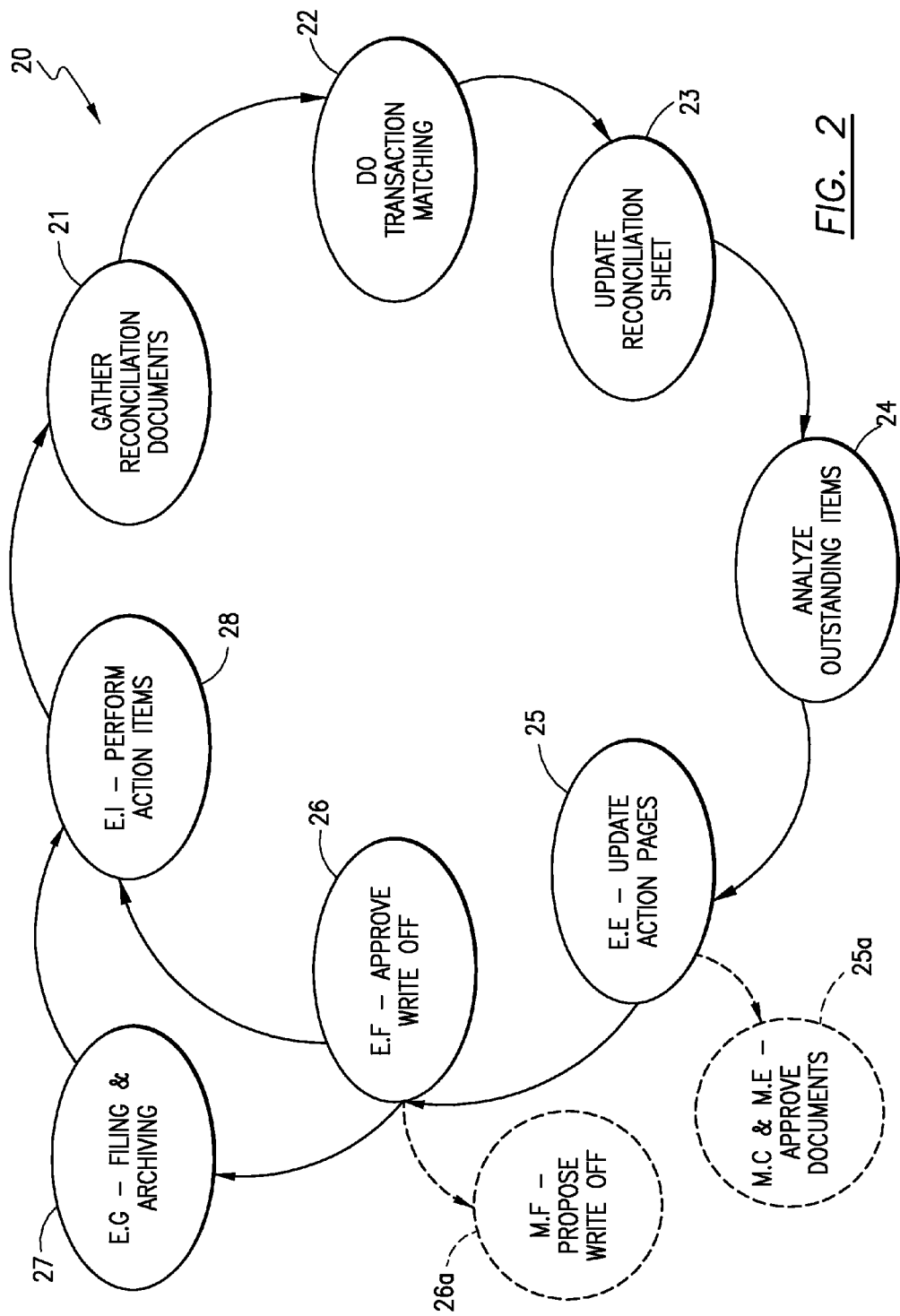
FIG. 2 shows a detailed process diagram for the execute macro process.

After developing the detailed plan 12, the accounting methodology calls for execution 13 on a computing device under an execute macro process. The heart of the invention is in the execute macro process. The execute macro process is embodied in a computer program product, comprising a computer usable medium having a computer readable program code embodied therein, said computer readable program code adapted to be executed to implement a method that enhances accuracy in enterprise accounting by performing account analysis. The execution 13 involves the steps of: gathering documents; matching transactions; updating reconciliation sheets; analyzing outstanding items; developing a write off proposal; and performing action items. These execute macro process steps, when executed by a computing device, perform an account reconciliation process that enhances accuracy in enterprise accounting by performing account analysis. The execute macro process 13 creates the reconciliation methodology's output documents and uses input documents as defined as reconciliation documents. FIG. 2 provides a detailed process diagram for the execute macro process. The execute process steps are shown as follows:

gather reconciliation documents, step 21;
transaction matching, step 22;
update reconciliation sheet, step 23;
analyze outstanding items, step 24
update action pages, step 25;
approve documents, step 25a;
propose write off, step 26;
approve write off, step 26a;
filing and archiving, step 27; and
performing action items, step 28.

Several individuals may be involved in the execute macro process such as processors, analysts, and approvers. The most important outcome of the execute macro process 13 is to measure the accounting accuracy metrics to determine if targets are met. Other notable outcomes are the metrics related to management performance and in-process metrics—p-metrics—such as outstanding items solution time, performance outstanding items totals, reconciliation process duration, and reconciliation sustaining cost. The detailed plan 12 may help find out the root causes for outstanding items and propose corrective actions. The upper limit duration for the execute macro process 13 added to the duration of the manage macro process 14, should be obviously less than the account reconciliation frequency. If the upper limit is exceeded, then new outstanding items may materialize, while the prior month outstanding items are still under analysis.

Next a manage macro process 14 comprises a collection of management actions that include at least the following:
Understanding expected metrics and its actual measurements
Ensuring the metrics are under control
Evaluating if current structure and resources matches the need for targets achievement or are under or over used
Preparing methodology presentation for the quarterly review with accounting accuracy committee The manage macro process 14 starts a new cycle as soon as the execute macro process 13 is finished for the current period. However, it does not finish when the next execute cycle starts, as management actions are not boxed into one-month time span.

Figure 3:
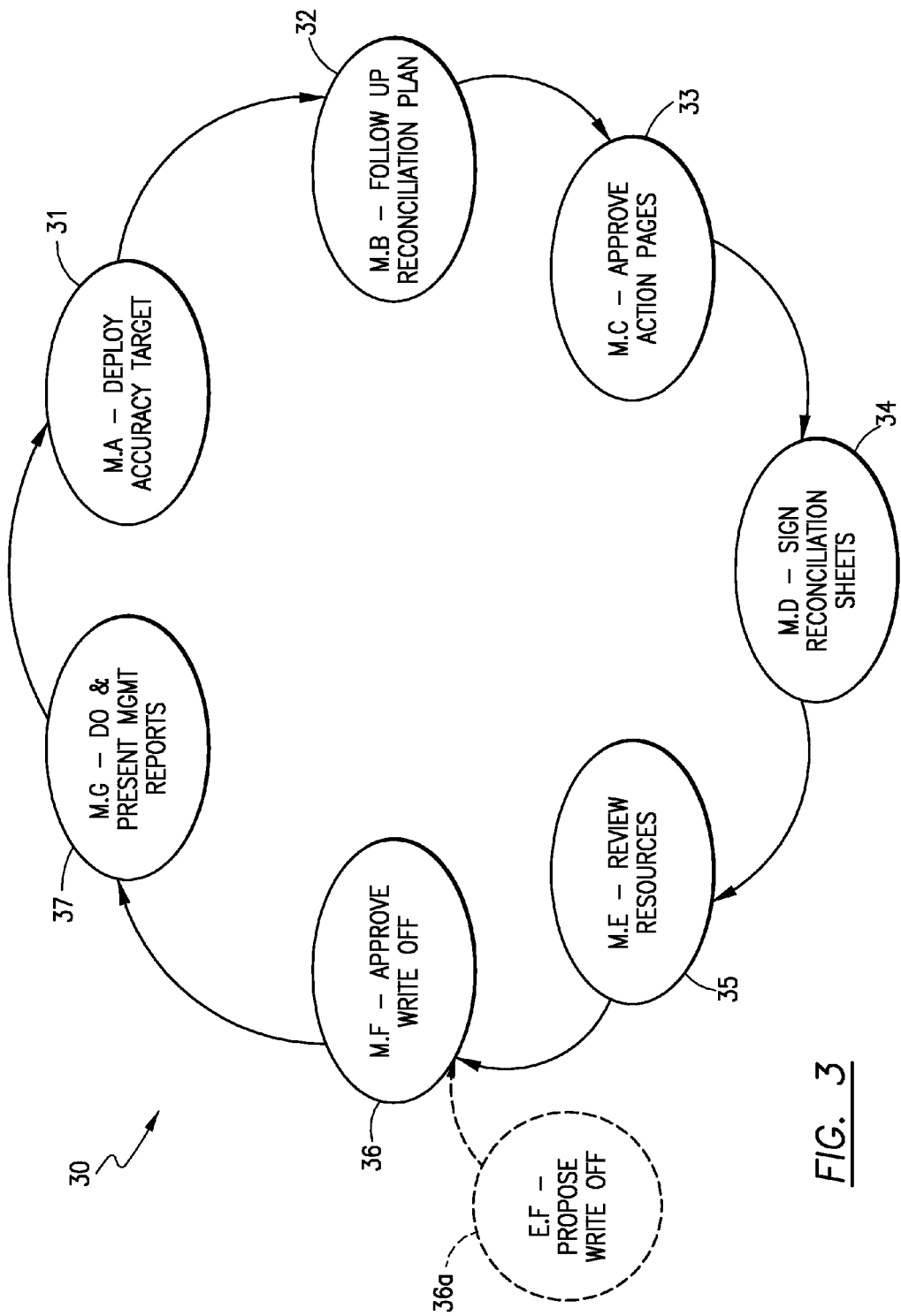
FIG. 3 provides a process diagram for the manage macro process.

FIG. 3 provides a process diagram 30 for the manage macro process. The manage macro process depicts a process of steps that flow from the execute macro process. The manage process includes the following steps:

deploying an accuracy target, step 31;
follow up on reconciliation plan, step 32;
approval of action pages, step 33;
signing of reconciliation sheets, step 34;
review of resources, step 35;
approval of write off, step 36;
proposal of write off, step 36a; and
present management reports, step 37.

A publish macro process 15 includes the following activities related to both internal and external communication.
Internal Communication
1) Presentation of the accuracy metrics, corrective action plan, and the mitigation actions which may result in publishing or requests additional actions;
2) Publication of actual results and targets for accuracy metrics;
3) Issuance of the statement of accounting accuracy.

The statement of accounting accuracy has four sections, which include: a general statement of current status; actual accuracy targets; corrective and mitigation actions; and a list of relevant issues that affect accuracy or targets achievement. Internally published accuracy documents are the main input for the "Set Directions & Targets" Macro Process.
External Communication may include:
Publication of actual results and targets for accuracy metrics to external parties that have a direct relationship with the company such as auditors, supporting banks, and shareholders; and
Optional publication to federal tax authorities, i.e., IRS or SEC, if a significant impact to the financial statements exists.
Account Reconciliation Overview
The present invention involves both transactional and non-transactional reconciliation methods. The following list represents the transactional reconciliation methods according to the present invention:
Standalone
Auxiliary Ledger (Subsidiary Ledger)
Bank
External Reference Intercompany Equity The non-transactional reconciliation methods include:

Historical Ledger

Accounts with currency other than ledger currency

Profit on Dual Currency Ledgers

A. Standalone

The standalone method of reconciliation applies to ledger accounts that have no auxiliary documents to support the accuracy of its balance. These accounts have neither an auxiliary ledger nor a statement of account from a third party, i.e., employees advance, employees loan, supplier advance, petty cash, prepaid expenses, deferred income, accrued revenue, and income taxes payable. FIG. 4 provides an overview diagram of the standalone method. For the standalone method, the preferred frequency is monthly and the alternate is quarterly but it depends on the transaction volume of the ledger account. It is preferred not to have more than one person doing journal entries to a ledger account that uses the standalone reconciliation method. Sometimes, an automated system generates either debits or credits for this account, but you still have one person in charge.

B. Auxiliary Ledger

The auxiliary ledger method applies to ledger accounts governed by an independent controlled accounting mechanism, which may be an automated system, a spreadsheet, or a pre printed form. Common applications of the auxiliary ledger include fixed assets, accounts receivable, accounts payable, inventory, loan, and accrued interest. FIG. 5 provides an overview of the auxiliary ledger method. The recommended frequency of reconciliation for accounts that record monies such as accounts receivable and accounts payable is daily, due to high volume of transaction, uncertainty, and liquidity. By doing it daily, you can promptly identify any discrepancy, corrective actions will be in place, and solution time will be smaller. Also, root causes will be easier to understand and problems found will not repeat throughout the month, due to early detection. A monthly reconciliation can be prepared as a summary of the daily reconciliation, only for reporting purposes, not for corrective actions. For other accounts governed by auxiliary ledgers, the frequency may be monthly if the volume is not too big compared to your company operational level.

C. Bank

Figures 6, 7:
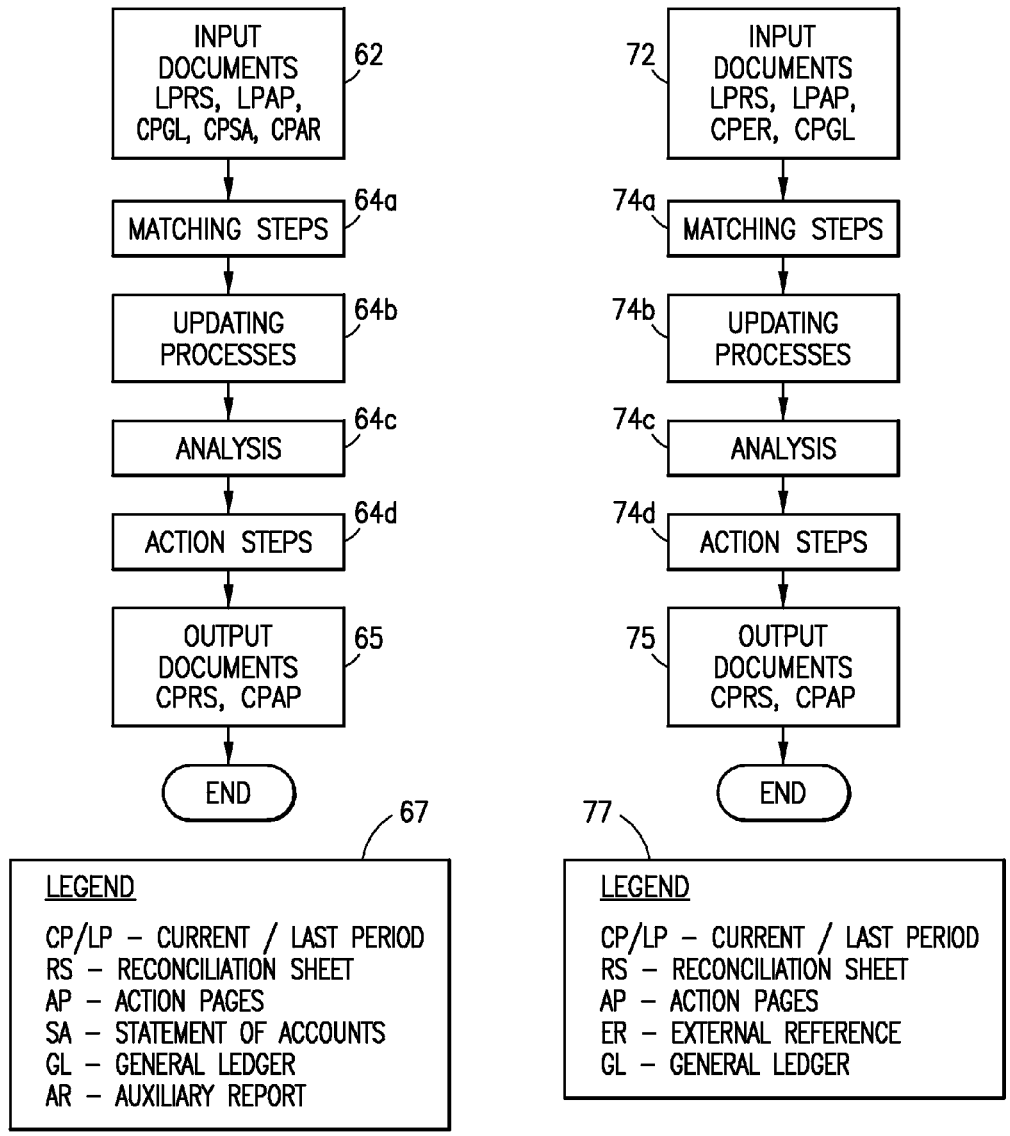
FIG. 6 shows a graphical representation of the bank reconciliation method according to the present invention.
FIG. 7 shows a graphical representation of the external reference reconciliation method according to the present invention.

The bank method applies to ledger accounts that control the monies a company has in a financial institution. These types of ledger accounts usually have a high number of monetary transactions and a minor checking account registered in a commercial bank for exclusive use of the company. FIG. 6 provides an overview diagram of the bank method.

Checking accounts, bank accounts with balance caps, short-term deposits, deposit only accounts, and saving accounts are the type accounts conducive for the ledger method.

For the bank method, the preferred frequency is daily and the alternate frequencies can be weekly, or monthly. It depends on the statement of Account availability and the transaction volume of the ledger account.

D. External Reference

The external reference method applies on ledger accounts that have an external reference document provided by a relationship third party entity that interacts directly with the company. The external reference method is a two-step process where the first step monitors the internal accuracy of the ledger account and second step validates the accuracy against the relationship entity. If the ledger account being reconciled has an auxiliary ledger, you need to perform the auxiliary ledger method in the first step, as explained later in the reconciliation method description. FIG. 7 provides an overview diagram for the external reference method.

Loans, investments in other companies, long-term deposits, and income tax payable are exemplary accounts, which are conducive for the external reference method. For the external reference method, the frequency can be monthly or quarterly depending on the external reference document availability and the transaction volume of the ledger account. External reference documents are not necessarily available with the frequency considered appropriate for the transaction level of the ledger account. For periods where the external reference is not available, a standalone reconciliation method may be performed. If an external entity supplies a statement with transactions and balances for a non-bank ledger account, you can use a bank reconciliation method, instead of an external reference reconciliation method.

E. Intercompany

The intercompany method applies on ledger accounts that are used primarily to control accounting events between two relationship entities, particularly equity-consolidated ones. Accounts for non-equity companies are usually reconciled by either standalone or external reference method. However, some closely related enterprises, although not controlling one another may use the intercompany reconciliation method. FIG. 8 shows an overview diagram of intercompany method.

Intercompany trade, royalties, loans, interest on loans, interest on intercompany, and miscellaneous intercompany transactions are exemplary applications for the intercompany reconciliation method. For the intercompany method, the preferred frequency is monthly and the alternate is quarterly, but a smaller period may be used depending on the transaction volume of the ledger account.

The intercompany method is the most difficult account reconciliation method, because an external contractual relationship does not exist with the parent/sister company to enforce a prompt outstanding item resolution. In contrast, third-party institutions have a more formal relationship than equity consolidated companies. A written agreement and firm adherence from both equity related companies may help improve intercompany accounts accuracy. Some discrepancies may occur due to business decisions not fully agreed between the companies. In this case, management needs to act.

F. Equity

The equity reconciliation method applies on all accounts reported within the equity section of the balance sheet, plus the legal obligations with major or minor shareholders, and accounts for rights in partnership entities. Capital, paid-in capital, retained earnings, declared dividends, and dividends payable are exemplary applications for the equity method. FIG. 9 shows an overview diagram of the equity method.

For the equity method, the preferred frequency is annual if the company does not participate in the stock market otherwise do it quarterly or whenever a shareholder event happens. Occurrence of equity transactions during the accounting year is small; therefore, you only need to compare balances of the historical ledgers against balances of ledger accounts in the Current Period General Ledger (CPGL). The current year earnings account will change throughout the year, but a universal accounting equation controls these changes.

G. Historical Ledgers

The historical ledger method applies on ledger accounts with high dollar account balances composed of high dollar accounting entries because most company funds go to them. The historical ledger demonstrates all accounting entries that once participated in the evolution of a ledger account irrespective of being part of the current balance.

The historical ledger is principally for equity accounts, where it shows the company economic evolution. The historical ledger may also be used to control ledger accounts such as investment in partnership companies or third party companies, dividends to shareholders, and dividends to minorities. Other opportunities to use the historical ledger are land, building, and some operational fixed assets. The frequency for the historical ledger preparation should follow the frequency defined for the ledger account it supports. However, if there is an account event that happens in a month where the account is not reconciled, you must still update the historical ledger.

Equity ledger accounts are the crown jewels of the company's economic evolution, so they need proper care. Equity ledger accounts store the company's economic evolution throughout several years. Therefore, in order to access and preserve the evolution history, it is necessary to extract their ledger entries and accumulate it in a single spreadsheet for later reference and analysis.

Historical ledgers expose the evolution of an equity account since its inception or at least since the historical ledgers were implemented allowing better understanding of the company economic history. Equity accounts must not carry outstanding items out from one fiscal year to the next because it would present an uncertain company financial snapshot and therefore, they must be solved and adjusted before the year-end financial statements.

One benefit of the equity historical ledger is to ensure the balance of GL equity accounts match their consolidation total. Every equity account must have one and only one historical ledger. However, some equity accounts no longer exist in the General Ledger due to several reasons where the related equity historical ledger shows a zero balance and they must be safely stored. If in the future, there is a need to reopen this account, use the same historical ledger again. Whenever an equity ledger account is no longer present in the general ledger, you must post a closing note to the historical ledger in the previous period and now consider it an inactive equity account.

H. Accounts Governed by a Foreign Currency

The foreign currency reconciliation method applies whenever the native currency for a ledger account is not the general ledger currency. The transactional reconciliation methods cover all kinds of ledger accounts, so they take care of balance accuracy. However, some accounts have transactions expressed in a currency other than the ledger currency and therefore require a two-step reconciliation effort. The first step involves the transactional reconciliation of the native currency and ledger currency accounts. The second step involves the foreign currency reconciliation. The selection of the account reconciliation method for the first step is not affected if the ledger account's native currency is not the local currency. One of the transactional reconciliation methods might be used.

To ease the foreign currency reconciliation method, use one ledger account for only one currency, therefore not mixing different currencies into one ledger account. The foreign reconciliation usually includes ledger accounts that contain foreign transactions such as foreign currency loans, foreign currency cash kept and imported goods payable in foreign currency. Local currency transactions indexed by an international currency also falls under this category. For the accounts controlled by a foreign currency, follow the elected frequency defined for the native currency account, either the preferred or the alternate.

I. Profit on Dual Currency Ledgers

Use the profit on dual currency method to ensure the accuracy of a financial statement translated to another currency or another accounting principle. Two factors influence the accuracy on the translation, the currency conversion process and the discrepancies between the base GAAP and the reporting GAAP. To cope with these factors, this methodology uses ledger account aggregates called translation components. The reconciliation method description provides more explanation about the translation components. Financial statement of foreign affiliates from transactional companies, Foreign GAAP financial statement to domestic-only, and auditors or internal controls certifying accuracy on statements translation are exemplary applications for the dual currency method. For the Profit on Dual Currency Ledgers method, the preferred frequency is quarterly, the alternate frequency is monthly depending on the complexity of the translation process, and the two GAAP involved.

Account Accurateness

The accuracy of accounting is a function of many factors such as suitability of supporting documents, management focus, degree of automation, people preparedness, proper granularity of the chart of accounts and the actual reconciliation process. These factors vary significantly among companies. Normally as more supporting documents are available for a reconciliation method, the higher the accurateness will be. Below is an accuracy analysis of each transactional reconciliation method where accuracy is ranked from higher to lower based on supporting reconciliation documents.

Group I—External Reference and Auxiliary Ledger

Both the external reference and auxiliary ledger methods use one supporting document.

Accuracy depends on the accuracy of each supporting document, which can only be determined case by case.

Group II—Bank

The bank method also uses one supporting document, so at first glance it should be as accurate as the methods for group I, the External Reference and Auxiliary Ledger. Bank accounts get more transactions than any other accounts, so its supporting document is inherently less accurate than all other.

Group III—Intercompany

Similar to Groups I & II, the intercompany method uses one supporting document, however it is less accurate because the General Ledger of a Relationship Entity for the Intercompany accounts accepts transactions without commitment from another party. Contracts, invoices or acceptance of services delivered do not exist between the relationship entities. The benchmark would be a company that uses a customer/supplier approach for the intercompany transactions between relationship entities. An automated system that controls the intercompany transactions up front does not help much unless accompanied with a contract or agreement between each pair of involved relationship entities.

Group IV—Standalone & Equity

Both the standalone and equity method do not use supporting documents, accordingly they are less accurate than all other methods. Equity accounts have very few entries so the equity method should be more accurate than the standalone method, and it is true for outstanding items. However, the Net Income entry, which is one of the most important entries, is an average-accurate entry as it is a blend of all other accounting entries, and consequently it carries out their accuracy or lack of accuracy.

This classification ensures that appropriate targets are set for the accounts governed by each reconciliation method. The targets for group I should be more aggressive than the targets for group II, which in turn has to be more aggressive than group III and IV.

Reconciliation Methods
Transactional Reconciliation Methods
Standalone

FIG. 4 shows a graphical representation of the stand alone reconciliation method according to the present invention. Initially, input documents 42 should be gathered as listed for standalone reconciliation method, Last Period Reconciliation Sheet (LPRS), Last Period Action Pages (LPAP), and Current Period General Ledger (CPGL). The resulting output documents 45 include the Current Period Reconciliation Sheet (CPRS) and Current Period Action Page (CPAP).

Initially the process involves matching 44a outstanding items on LPRS against CPGL entries and noting the matched entries in both documents. Next the accounting entries on CPGL are matched against entries in the same document where again matched entries are noted. As a rule of thumb, accounting entries that match in the same period are seldom from regular operations, which usually finish the following month. These entries are likely to be adjustment entries.

Next, the CPRS should be updated 44b by copying all un-matched items from LPRS to a blank reconciliation sheet, the CPRS. Add the unmatched accounting entries from CPGL to CPRS, which become new outstanding items. The unmatched items must be classified as either performance or inaccurate outstanding items classes. For inaccurate items, analysis 44c must be performed to further classify them by Inconsistency, Excess/lack of entries, Matching key, or Unidentified Items. The items roll up to the Standalone Overall Reconciliation Box, by using formulas that refer to the Reconciliation Sheet.

After copying and adding un-matched entries, the CPRS total must match the CPGL account balance, unless there is a glitch somewhere in the matching process. Revision may be required until CPGL balance and CPRS total are the same. The next step involves updating the action pages, first LPAP should be cleared for each action item listed on LPAP that was finished in the current period. Some action items may not result in the elimination of an outstanding item. Therefore, analysis 44c may include clarification actions or information seeking actions.

The final actions 44d related to the standalone method include copying all unfinished action items from LPAP to a blank action page sheet, the CPAP. Also, an action item in the CPAP must be created for every new outstanding item listed on CPRS related either to accuracy or to performance. CPAP and CPRS are shown as output documents 45. A legend 47 is provided for the associated abbreviation of FIG. 4. An exemplary standalone reconciliation box and sheet are shown below.

| Logotype | Overall Reconciliation Box | | Standalone |
|---|---|---|---|
| Company Name | Reporting Period: | 31-Mar-10 | Page 1 of 1 |
| Reconciliation Elements | | Reconciliation Sheet | General Ledger |
| Ending Balance | | | 1,226.00 |
| 1. Accurate Outstanding Items | | 1,200.00 | |
| 2. Inaccurate Outstanding Items | | 26.00 | |
|    Inconsistent Entries | IE | (1.00) | |
|    Excess or lack of Entries | EL | 25.00 | |
|    Incorrect Matching Key | MK | 38.00 | |
|    Unidentified Items | UN | (36.00) | |
| (=) Reconciled Ending Balance | | 1,226.00 | 1,226.00 |
| Retention | Processor Name | Proc. Date | Confidentiality |
| Frequency = M | Approver Name | Approval Date | Form ID |

| Logotype | Reconciliation Sheet (RS) | | 141.21 In-transit Inventory | | | Standalone | |
|---|---|---|---|---|---|---|---|
| Company Name | | | 31-Mar-10 Currency: | $Locals | | Page 1 of 1 | |
| Date | Item # | Item Description | Key | Debit | Credit | Type | X-Ref |
| 1. Accurate Outstanding Items | | | | | | | |
| 3-Feb-10 | 0009 | xxxxxxxxxx1 | 3A234 | 1,313.00 | | | |
| 4-Feb-10 | 0010 | xxxxxxxxxx2 | 3A235 | | 117.00 | | |
| 3-Mar-10 | 0010 | xxxxxxxxxx1 | 3A234 | 87.00 | | | 0004 |
| 4-Mar-10 | 0011 | xxxxxxxxxx2 | 3A235 | | 83.00 | | 0004 |
| Total Accurate Items | | | 4 | 1,400.00 | 200.00 | 0 | |
| 2. Inaccurate Outstanding Items | | | | | | | |
| 4-Mar-10 | 0012 | xxxxxxxxxx3 | 3J002 | 20.00 | | IE | |
| 5-Mar-10 | 0013 | xxxxxxxxxx4 | 3J003 | | 21.00 | IE | |
| 6-Mar-10 | 0014 | xxxxxxxxxx5 | 3J004 | 30.00 | | EL | |
| 7-Mar-10 | 0015 | xxxxxxxxxx6 | 3J005 | | 5.00 | EL | |
| 8-Mar-10 | 0016 | xxxxxxxxxx7 | 3J006 | 38.00 | | MK | |
| 9-Mar-10 | 0017 | xxxxxxxxxx8 | 3J007 | | 36.00 | UN | |
| Total Inaccurate Items | | | 6 | 88.00 | 62.00 | 6 | |
| Total Reconciliation Sheet | | | 10 | 1,433.00 | 262.00 | 6 | |
| Retention | Processor Name | Proc. Initials | | | Proc. Date | Confidentiality | |
| Frequency = M | Approver Name | Approv. Initials | | | Approv. Date | Form ID | |

Auxiliary Ledger

The initial step regarding the auxiliary ledger includes gathering input documents 52 as shown in FIG. 5, which include Last Period Reconciliation Sheet (LPRS), Last Period Action Pages (LPAP), Current Period Activity Report (CPAR), Current Period Auxiliary Journal (CPAJ), Current Period General Ledger (CPGL), Last Period Auxiliary Ledger (LPAL), and Current Period Auxiliary Ledger (CPAL).

The matching step 54a includes non-auxiliary ledger outstanding items from form #5 on LPRS against CPGL entries that do not come from the auxiliary ledger controlling this ledger account and then dashing items that match in both documents. Next, we should designate CPGL adjustment accounting entries that correct systems related discrepancies found in previous periods, and dash these entries against the discrepancy listed in CPRS.

A second matching function involves identifying the remaining un-dashed CPGL entries that do not come from auxiliary ledgers and then matching those entries against each other within the CPGL where the matching ones should be dashed.

A third matching function involves proceeding with the AL internal systems consistency matching, which is one of the most overlooked matching steps, yet very powerful, in the auxiliary ledger reconciliation method. Initially, we must pick up LPAL, CPAL, and CPAR and evaluate the following formula for each CPAL subtotal.

AL Net Discrepancy=LPAL Ending Balance plus CPAR increases less CPAR decreases less CPAL Ending Balance.

The LPAL Ending Balance should not come from the CPAL beginning balance. The LPAL ending balance must come from the AL printout issued a month ago, the actual LPAL.

CPAR Increases=Sum of any items from CPAR that increase the total open balance which could be brand new items, adjustments, etc.

CPAR Decreases=Sum of any items from CPAR that decrease the total open balances which could be items clearing, adjustment, write-downs, etc.

If the net discrepancy is not equal to zero, then an investigation must be conducted to resolve the discrepancy. Systems generated discrepancies can be massive and very material and while they are unsolved, record them as an outstanding item in form #1 on the CPRS and create an action item in the CPAP.

Two options exist to fix internal discrepancies related to automated systems either a system reprocessing or an accounting adjustment.

System reprocessing of an automated system consists of the following activities:

Restore the system's data to a point when the wrong transaction has happened in place Make the necessary correction in the system if necessary, and test it Reprocess the system Issue the new activity reports Generate the new revised journal Reverse the old incorrect journal Revise the reconciliation sheet to include the new entries The accounting adjustment consists of the following activities:

Identify the discrepancy through the specific reconciliation template.

Assess if the discrepancy will not be fixed automatically by the next month CPAJ, a more permanent one.

If the discrepancy remains, prepare an adjusting journal to correct the wrong entries in all ledger accounts, not only the one being reconciled.

If it is not possible to evaluate all effects of the discrepancy in all ledger accounts, correct as much as you can and move on.

Next period, dash the adjustment entry against the related systems discrepancy from prior period.

The first option, system reprocessing, is cleaner as it avoids the creation of an outstanding item and its correction, but it requires a complex effort to undertake it. The second option, account adjustment, is easier and requires less effort, but it keeps the wrong entry and the adjustment entry. When using the system reprocessing, it is likely that unexpected transactions will show up, other than the ones already identified.

A fourth matching step includes comparing CPAR against CPAJ. If a CPAJ does not exist, then develop it by using the template provided in the input documents section. The effectiveness of this comparison depends on how suitable your CPAR is for account reconciliation. First pull the column totals in CPAR for each transaction type, then find the debit and credit totals for the ledger accounts matched to every transaction type within CPAJ. The net account total of CPAJ—debits less credits—must match CPAR column total. If it matches, then dash both totals in each report and copy them to the form #2 of CPRS. If it does not, create two new items in CPRS the Increases/Additions and Decreases/Deductions with the respective amounts for the CPAJ and the CPAR for the transaction type being reconciled. Differences in cut off date between auxiliary ledger and GL will likely show up in this matching step.

Next, repeat the process for all other CPAR transaction types, and all CPAJ net total—debits less credits—columns. Occasionally, more than one transaction type shares the same ledger account, if so add totals for each CPAR transaction type and then compare them to CPAJ. An activity system like a billing system, may relate to more than one ledger account, so ensure that CPAR has appropriate subtotals to match each ledger account.

A fifth matching step includes a comparison of net account totals in CPAJ against the equivalent totals in each ledger account in CPJO (Current Period Journal). If CPJO entries coming from auxiliary ledgers are summary entries, it is much easier to match them visually.

Generally total accounting entries coming from the auxiliary ledger, via CPAJ, always match the journal totals created and posted to GL, although it is not always a precise statement though.

The mechanism that creates, transfer, and post journal entries are far more complex than one could imagine. Even if you purchase and implement a fully integrated financial system, this integration is architected and developed by several programmers, so nothing replaces a monitoring from an accountant. The fifth matching should be very simple if CPAJ is tailored to ease the comparison, otherwise it becomes a more complex task.

During the posting process, some accounting entries don't find a correspondent account within the chart of accounts, and then are sent to a special account usually named suspense account. The suspense account should be scrutinized to find any entry that belongs to the account being reconciled and therefore placed in the action page.

A sixth matching step involves the GL Internal Systems consistency matching procedure and it is performed globally at period end.

A seventh matching step occurs when more than one AL interacts with one ledger account, we need to reconcile the transactions between every two pairs.

The following represents matching the procedures for non-automated auxiliary ledgers.

Let's follow the matching steps of the automated auxiliary ledger and adjusting a non-automated auxiliary ledger to fit.

The first, second and third matching procedures are the same as the ones above related to the automated auxiliary ledgers. The AL spreadsheet should have totals for increases and decreases. The fourth and fifth matching steps both use the CPAJ but the workload for a manual CPAJ from a non-automated auxiliary ledger is intensive, so let's assume you will not make it. However, the matching steps are similar to the automated ledger one.

Due to the absence of CPAJ, the comparison will not happen between CPAR against CPAJ and between CPAJ against CPJO. The comparison will be done directly between CPAR and CPJO.

You need to tailor the non-automated auxiliary ledger to help the execution of the fourth/fifth match, and this task only involves the accountants. Create an activity report showing the transactions that occurred in the current period. This activity report will be the supporting document for the Journal, however avoid creating the Journal directly from the auxiliary ledger. In the case where one non-automated AL controls more than one ledger account, ensure it includes totals that allow the matching with each ledger account balance.

The sixth matching step is the same as the sixth matching step for the automated auxiliary ledger.

Following the first match updating 54*b* takes place, such as copying all un-dashed outstanding items from LPRS to CPRS and adding new un-dashed outstanding items from second match. Further updates include: adding any new outstanding items for discrepancies between CPAR and CPAJ, detected on the third match; adding any outstanding items for discrepancies between CPAJ and CPGL detected in the fourth match; and adding system generated discrepancies from the fifth match. Finally, analysis 54*c* includes comparisons of totals from newly created CPRS to the CPGL account balance, if they do not match, review the five matching steps until the discrepancy is identified and corrected. This discrepancy should not be written off because it is a mistake related to compiling the data.

Action activities 54*d* include entering your initials and date for each action item in LPAP that was finished, and copying unfinished remaining action items on LPAP to the CPAP. For every new outstanding item, that needs further investigation or the entry is not clear enough, please record an action item in CPAP.

Output documents 55 include, which is the total of CPAP, the amount representation of issues that involve actions. The auxiliary ledger carries the performance related outstanding items, so they are not shown in the CPAP. In the auxiliary ledger method, the CPAP action items usually are related to accuracy. Legend 57 provides nomenclature for FIG. 5. An exemplary auxiliary ledger reconciliation box and sheet are shown below.

| Logotype | Reconciliation Sheet | #141.11-Raw Material | Auxiliary Ledger |
|---|---|---|---|
| Company Name | 31-Mar-10 Currency: | $Locals | Page 1 of 3 |

| Overall Reconciliation Box | Auxiliary Ledger | |
|---|---|---|
| Reconciliation Elements | Auxiliary Ledger | General Ledger |
| Ending Balance | 2,450.00 | 2,407.00 |
| Current period discrepancies | | |
|   Debit | | (36.00) |
|   Credit | | 20.00 |
| AL system discrepancies | | |
| 1. Auxiliary Ledger System Internal Accuracy | (50.00) | |
| 2. Auxiliary Journal versus Activity Report | 190.00 | |
| 3. Auxiliary Journal versus GL Journal Debit | | (20.00) |
| 3. Auxiliary Journal versus GL Journal Credit | | 2.00 |
| 4. GL System Internal consistency | | (1.00) |
| Inter-systems discrepancies | | |
| 1. Activity Report- Source vs. Destination | | |
| 2. Source Activity Report vs. GL JO | | |
| Prior periods discrepancies-Accumulated | (218.00) | |
| (=) Reconciled Ending Balance | 2,372.00 | 2,372.00 |
| (=) Count of outstanding items | 2 | 9 |

| 1. Auxiliary Ledger System Internal Accuracy | |
|---|---|
| Current Period | Aux Ledger |
| Last Period Ending Balance | 2500 |
| (+) New increases / additions | 200 |
| (--) New decreases / deductions | 300 |
| (--) Ending Balance | 2450 |
| (=) Net AL discrepancy | -50 |

| Retention | Proc. Date | Proc. Initials | Processor Name | Confidentiality |
|---|---|---|---|---|
| Frequency = M | Approv. Date | Approv. Initials | Approver Name | Form ID |

| Logotype | Reconciliation Sheet (RS) | | 141.11 Raw Material | Auxiliary Ledger |
|---|---|---|---|---|
| Company Name | 31-Mar-10 Currency: | $Locals | | Page 2 of 3 |

| 2. Auxiliary Journal versus Activity Report | | |
|---|---|---|
| Current Period | (+) New increases / additions | (--) New decreases / deductions |
| Auxiliary Journal | 300 | 210 |
| Activity Report | 200 | 300 |
| (=) AJ vs AR variance | 100 | -90 |
| (=) Net variance | 190 | |

-continued

| 3. Auxiliary Journal versus Activity Report | | | |
|---|---|---|---|
| Current Period | Debits | Credits | Var. Dr/(Cr) |
| Aux Journal | 300 | 210 | |
| GL Journal | 320 | 212 | |
| | | | |
| (=) Net variance | (20) | (2) | (18) |

| Retention | Proc. Date | Proc. Initials | Processor Name | Confidentiality |
|---|---|---|---|---|
| Frequency = M | Approv. Date | Approv. Initials | Approver Name | Form ID |

| Logotype | Reconciliation Sheet | ## | 141.11-Raw Material | Auxiliary Ledger |
|---|---|---|---|---|
| Company Name | 31-Mar-10 Currency: | $Locals | | Page 1 of 3 |

| 4. GL System Internal consistency | | |
|---|---|---|
| Current Period | DR | CR |
| LP Ending Balance | 2282 | |
| (+) AL Accounting entries | 320 | 212 |
| (+) Any other accounting entries | 36 | 20 |
| | | |
| (--) CP Ending Balance | 2407 | |
| (=) GL Net Variance | | -1 |

| 5. GL - Non-Auxiliary Ledger Entries | | | |
|---|---|---|---|
| Date | Types of Journals | DR | CR |
| 15-Mar-10 | Manual Journal 1 | 8 | |
| 16-Mar-10 | Manual Journal 2 | 4 | |
| 16-Mar-10 | Alien Manual Journal Entry 1 | | 3 |
| 16-Mar-10 | Alien Manual Journal Entry 1 | 14 | |
| 16-Mar-10 | Alien Manual Journal Entry 1 | | 17 |
| 16-Mar-10 | Alien Manual Journal Entry 1 | 10 | |
| (=) Total | | 36 | 20 |
| (=) DR and CR Count | | 6 | |

| Retention | Proc. Date | Proc. Initials | Processor Name | Confidentiality |
|---|---|---|---|---|
| Frequency = M | Approv. Date | Approv. Initials | Approver Name | Form ID |

Bank

Initially input documents 62 are gathered as shown in FIG. 6 for bank reconciliation method, which include Last Period Reconciliation Sheet (LPRS), Last Period Action Pages (LPAP), Current Period General Ledger (CPGL), Current Period Statement of Accounts (CPSA), and Current Period Auxiliary Report (CPAR). Some companies use an automated auxiliary ledger to control treasury related transactions such as bank transfers, loan payments, and time deposits. Therefore, they may choose not to populate the general ledger with detailed accounting entries, if so then the CPAL is also needed as an input document.

The matching processes 64a are as follows. The first matching sequence involves matching statement of account SoA-related outstanding items from LPRS against entries in CPSA and dashing items that match in both documents. Next under the second matching sequence, GL-related outstanding items from LPRS are matched against entries in CPGL and dashing items that match in both documents. Most matching on this step corrects mistakes from previous months.

The third matching sequence involves entries from CPGL against entries in CPSA and dashing both entries that match. If offset entries within and between the CPSA occur, then every CPSA entry should be matched only against CPGL, or otherwise the GL counter account entries will over run. A bank transaction does not need an entry in the General Ledger, if the bank makes a mistake and is now reversing the incorrect entry.

The fourth matching sequence includes a GL current period entry offsetting another GL entry within the same period, where a mistaken GL entry is promptly solved.

After matching is complete, update 64b of CPRS takes place. Two groups of outstanding items in the bank reconciliation method usually exist 1) outstanding items from a company general ledger, GL-related, 2) and outstanding items from bank statement of accounts, SoA-related. After performing the first and second match, all un-dashed SoA and GL outstanding items are copied from LPRS to CPRS output document 65. Next, add GL and SoA entries that were not dashed in the third and in the fourth match. If the matching process and the copy of un-dashed entries are precisely made, GL and RS reconciled totals in CPRS must be the same. Next updating 64b of the action pages takes place for each action item listed on LPAP that was finished in the current period. Some action items may not result in the elimination of an outstanding item, such as clarification actions or information seeking, which are part of the analyzing 64c processes. All unfinished remaining action items are copied from LPAP to a blank action page sheet, the CPAP output document 65. For every outstanding item from the ledger that doesn't seem to belong to this bank account, write down an action item in CPAP. Also, write down an action if the entry is not clear enough to do the matching. An exemplary bank reconciliation box and sheet are shown below.

| Logotype | Overall Reconciliation Box | | Bank |
|---|---|---|---|
| Company Name | Reporting Period: | 31-Mar-10 | Page 1 of 1 |
| Reconciliation Elements | | Statement of Account | General Ledger |
| Ending Balance | | 950.00 | 1,000.00 |
| (--) Not registered increases | | 60.00 | 40.00 |
| 1. Accurate Outstanding Items | | 50.00 | 40.00 |
| 2. Inaccurate Outstanding Items | | 10.00 | |
| (+) Not registered decreases | | 45.00 | 105.00 |
| 1. Accurate Outstanding Items | | | 105.00 |
| 2. Inaccurate Outstanding Items | | 45.00 | |
| (=) Reconciled Ending Balance | | 935.00 | 935.00 |
| Retention | Processor Name | Proc. Date | Confidentiality |
| Frequency = M | Approver Name | Approval Date | Form ID |

| Logotype | | Reconciliation Sheet (RS) | | 111.11 Cash and Banks | | | Bank |
|---|---|---|---|---|---|---|---|
| Company Name | | | | 31-Mar-10 Currency: $Locals | | | Page 1 of 1 |
| Date | Item # | Item Description | Key | Debit | Credit | Type | X-Ref |
| 1. Statement of Account Outstanding Items | | | | | | | |
| 26-Dec-09 | 22 | | kkkkkkk1 | 100.00 | | IE | |
| 12-Mar-10 | | | bbbbbb1 | 5.00 | | | |
| 20-Mar-10 | | | bbbbbb14 | | 15.00 | | |
| 29-Mar-10 | | | bbbbbb16 | | 25.00 | CO | |
| Total SoA Item | | 29-Mar-10 | 4 | 105.00 | 40.00 | | 2 |
| 2. General Ledger Outstanding Items | | | | | | | |
| 27-Dec-09 | 23 | | kkkkkkk5 | | 30.00 | IE | |
| 10-Mar-10 | 1 | | bbbbbb0 | | 10.00 | IE | |
| 15-Mar-10 | 7 | | bbbbbb7 | 45.00 | | UN | |
| 25-Mar-10 | 18 | | bbbbbb15 | | 20.00 | EL | |
| Total G/L Items | | | 4 | 45.00 | 60.00 | | 4 |
| Total Reconciliation Sheet | | | 8 | 150.00 | 100.00 | | 6 |
| Retention | Processor Name | Proc. Initials | | Proc. Date | | Confidentiality | |
| Frequency = M | Approver Name | Approv. Initials | | Approv. Date | | Form ID | |

External Reference

Figure 13:
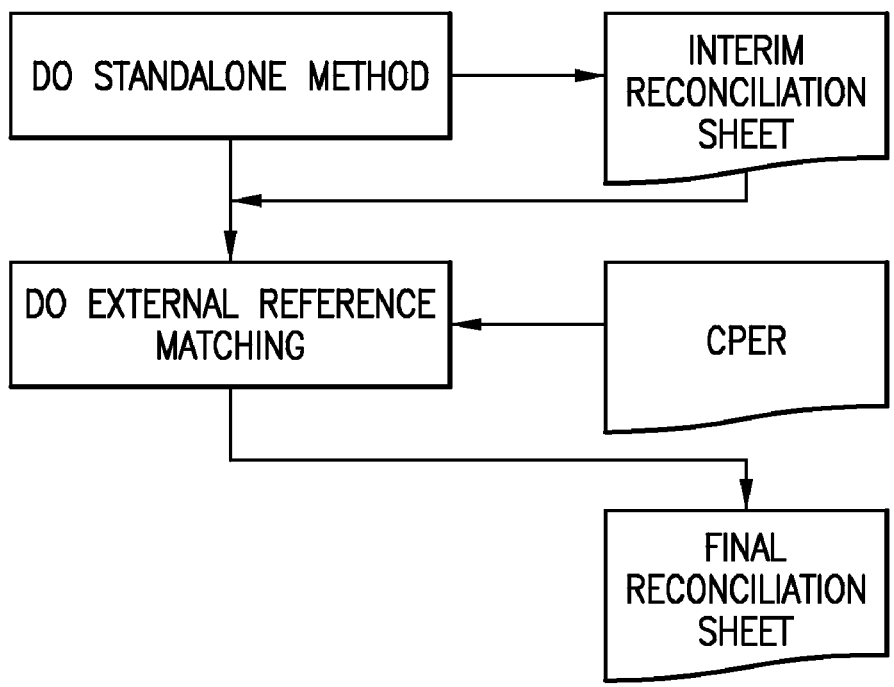
FIG. 13 shows a flow chart of the external reference reconciliation method according to the present invention.

The input documents 72 as shown in FIG. 7 for external reference reconciliation method include the Last Period Reconciliation Sheet (LPRS), Last Period Action Pages (LPAP), Current Period General Ledger (CPGL), and Current Period External Reference (CPER). A diagram of the external reference reconciliation is shown in FIG. 13.

Matching Procedure

The first step in the External Reference matching procedure 74a seeks to improve accuracy in the ledger account using only internal supporting documents, in order to take care of its internal accuracy. Any discrepancies originated by inconsistent, duplicated, or lack of entries will be processed and solved in this step. Choose the reconciliation method for the first step depending on the type of ledger account you are processing. If the ledger account has an auxiliary ledger use the auxiliary ledger method, otherwise use the standalone method. The interim CPRS and CPAP created after the first step will be input documents for the second step, which in turn will take care of discrepancies related to the ER document. Those two interim documents will get additional entries on the second step.

The second step of this method involves picking up the interim CPRS generated in the first step and CPER. Inaccurate entries detected by the first matching procedure are already entered in the interim CPRS, so the comparison with CPER is based on a more accurate GL account balance.

The first matching sequence involves comparing the amounts in the ER column of accurate outstanding items in the interim CPRS against CPER and dashing ER amounts of CPRS items that no longer exist in CPER. Dashing of the ER amounts is not necessarily eliminating the line, because the GL amount may be pending. Inaccurate outstanding items originated in the GL section of the interim CPRS, should be taken care of in the first reconciliation step. It is common that the ledger account being reconciled comprises more than one sub totaled group in the CPER document. If this is the case, you have to combine CPER groups to allow a comparison.

The second matching sequence involves comparing outstanding items from the ER inaccurate items section of the interim CPRS against CPER and dashing the items that match, which eliminates the complete item, as there is only one the ER amount. The third matching sequence involves matching GL adjustment entries on the GL section of the CPRS against the variations between the External Reference and General Ledger columns on the accurate entries section of CPRS and dashing both entries that match. Repeat the process for inaccuracies on the ER section.

Next, updating 74b of the CPRS is required. The External Reference reconciliation sheet has two sections, one for General Ledger discrepancies, and another for External Reference discrepancies. GL inaccurate items usually come from the first reconciliation step and ER inaccurate items usually come from the second step. If mismatch occurs between two transactions—one from ER and its equivalent in GL—it may be necessary to add the two items to each respective section, and thus create more visibility than to add only one outstanding item with the net amount.

Once internal inaccurate items have been found, they need to be added to an interim CPRS. To update the CPRS 74b, use the update CPRS procedure described either in the standalone reconciliation method or on the auxiliary ledger reconciliation method. Next, add the newly found discrepancy items to the final CPRS. Copy the new accurate entries from CPER to the interim CPRS onto the accurate items section. If there is not yet an item coming from the first step, append a new item and enter no amount for the GL column, analyzing 74c. Add new ER inaccurate entries to the ER outstanding items section of CPRS.

After updating CPRS, we must address the action pages 74d, therefore each action item in LPAP that was finished should be initialed and dated. In order to update CPAP, use the same procedure described for standalone accounts or auxiliary ledger method. Create one subtotal for outstanding items coming from the General Ledger. Additionally, enter the action items related to inaccurate items found while comparing to CPER, analyzing 74c. Inaccurate items require a corrective action item in the action page. Create another subtotal for action items coming from the external reference matching. Do not mix them with the action items coming from the general ledger. Add an action item to the CPAP for any discrepancy between CPRS and CPER. This kind of action item is more of an investigative process, as it is related to an uncontrolled source, an external entity. CPRS and CPAP are shown as output items 75.

Solving External Reference Outstanding Items

Below are some activities that help to identify and solve ER outstanding items.

1. Check if the discrepancy was created or otherwise only increased this month. If it was created this month, it is likely to be either a seasonal entry in the external reference document or an abnormal entry in the ledger account, not expurgated as showed in the second step. If it has increased this month, it is likely to be a repetitive entry in the external reference document not yet captured in the General Ledger.
2. Calculate the variation between current and last period balance for the ledger account, against the variation between current and last period ending balance for the external reference document. To remove cutoff discrepancies, compare the two variations. If the comparison yields a significant difference, pay attention if there is an important new accounting event listed in either one of documents.
3. Verify if the CPGL and CPER cut-off dates are the same. If the cut off dates are not the same, you need to expurgate the accounting entries that have happened after the reference document cut off date, to do a proper comparison.

An exemplary external reconciliation box and sheet are shown below.

| Logotype | Overall Reconciliation Box | | External Reference |
|---|---|---|---|
| Company Name | Reporting Period: | | 31-Mar-10 Page 1 of 1 |

| Reconciliation Elements | | External Reference | General Ledger |
|---|---|---|---|
| Ending Balance | | 1,710.00 | (1,650.00) |
| 1. Accurate Outstanding Items | | | |
|   Cut off Dates | CO | | (200.00) |
|   Incorrect Amount | IA | (20.00) | 70.00 |
| 2. Inaccurate Outstanding Items | | | |
|   Alien Entry | AE | | 100.00 |
|   Bank Fees not agreed | BF | (10.00) | |
| (=) Reconciled Ending Balance | | 1,680.00 | (1,680.00) |

| Retention | Processor Name | Proc. Date | Confidentiality |
|---|---|---|---|
| Frequency = M | Approver Name | Approval Date | Form ID |

| Logotype | Reconciliation Sheet (RS) | | 211.11 Loans | | | External Reference |
|---|---|---|---|---|---|---|
| Company Name | | | 31-Mar-10 Currency: | | $Locals | Page 1 of 1 |

| Date | Item # | Item Description | ER | GL DR | GL CR | Discrepancy | Type |
|---|---|---|---|---|---|---|---|
| 1. Actions on Accurate Items | | | | | | | |
| 15-Feb-10 | 1 | Loan #001 | 700.00 | | 700.00 | 70.00 | IA |
| 19-Feb-10 | 2 | Loan #002 | - | 140.00 | 120.00 | (20.00) | IA |
| 23-Mar-10 | 3 | Loan #003 | 500.00 | | 500.00 | - | |
| 27-Mar-10 | 4 | Loan #004 | 200.00 | | | (200.00) | CO |
| 28-Mar-10 | 4 | Loan #005 | 300.00 | | 270.00 | (30.00) | IA |
| Total Accurate Items | | 5 | 1,700.00 | 140.00 | 1,660.00 | (180.00) | 4 |
| 2. Inaccurate Outstanding Items | | | | | | | |
| 24-Mar-10 | 6 | Loan #010 - Fees | 10.00 | | | (10.00) | BF |
| 21-Mar-10 | 4 | Savings #001 | | | 100.00 | 100.00 | AE |
| 30-Mar-10 | 8 | Loan #005 - Adjustment | | | 100.00 | 30.00 | IA |
| | | | | | 30.00 | | |
| Total Inaccurate Items | | 0 | 10.00 | - | 130.00 | 120.00. | 0 |
| Total Reconciliation Sheet | | 5 | 1,710.00 | 140.00 | 1,790.00 | (60.00) | 4 |

| Retention | Analyst Name | Analysis Date | Analyst Initials | Confidentiality |
|---|---|---|---|---|
| Frequency = M | Approver Name | Approval Date | Approv. Initials | Form ID |

Intercompany

The input documents 82 as shown in FIG. 8 for Intercompany reconciliation method are Last Period Reconciliation Sheet (LPRS), Last Period Action Pages (LPAP), and Current Period General Ledger (CPGL) from your company and the parent company. Optimally, intercompany accounts should have the same account number throughout the enterprise. A common enterprise wide chart of accounts may not exist, but there is no reason whatsoever for the number of the Intercompany Accounts to be different.

The matching procedures 84*a* for the intercompany method use a similar approach to the bank reconciliation method, as the statement of account has a structure that is closer to the parent company general ledger. If the parent company CPGL is not available on time for the matching procedure, an alternate interim reconciliation method must be used. If parent company CPGL is not available when you are doing the reconciliation process, skip second and third match, and perform first and fourth match only. When parent company CPGL arrives, perform the steps that were skipped. The best scenario is when both companies have their counter company CPGL promptly. Throughout the Intercompany reconciliation method, for exemplary purposes, the reconciliation company is Company A, and the parent company—the one your company has a relationship with—is Company B.

The first matching sequence involves matching outstanding items on LPRS against CPGL entries from company A and dashing items that match in both documents. The second matching sequence involves matching outstanding items on LPRS against CPGL entries from the company B and dashing items that match in both documents. The third matching sequence involves matching un-dashed accounting entries from Company A CPGL against un-dashed entries from Company B CPGL and dashing the entries that match in both documents. The fourth matching sequence involves matching un-dashed accounting entries from Company A CPGL against other entries in the same company CPGL and dashing the entries that match in both documents. No regular entries shall be offset within the Company A CPGL itself. However, incorrect entries may be reversed by an offset entry within the same period in Company A CPGL.

The fifth matching sequence involves a repeat of the Fourth Match for company B CPGL. Finally, the sixth matching sequence requires that accountants from company A and company B do their normal reconciliation process and later they exchange their CPRS for cross check. Discrepancies found between each CPRS are therefore easier to solve since they are already analyzed by each accountant, and they fall within their accounting role.

Next, the CPRS must be updated 84*b*. Two groups of outstanding items exist in the Intercompany reconciliation method; the ones from Company A and the others from company B. Copy all un-dashed outstanding items of company A LPRS to CPRS. Add new un-dashed accounting entries from Company A CPGL to CPRS. Repeat these two steps for outstanding items and accounting entries of Company B. If the matching procedure and the above copy are correctly made, totals in CPRS must tie totals in both Company A and company B CPGL analysis 84*c*.

After updating CPRS 84*b*, we must update the action pages 84*d*. Each action item that was successfully closed should be initialed and dated, but not copied to CPAP. In order to update CPAP 84*b*, one must copy unfinished action items from LPAP to the CPAP. For every new outstanding item that needs further investigation, requires management actions, or it is not clear enough, add an action item to CPAP. As stated above, the CPAP total means the amount representation of issues that adversely affects your ledger account. CPRS and CPAP are shown as output documents 85. An exemplary intercompany reconciliation box and sheet are shown below.

| Logotype | Overall Reconciliation Box | | Intercompany |
|---|---|---|---|
| Company Name | Reporting Period: | 31-Mar-10 | Page 1 of 1 |

| Reconciliation Elements | GLRelationship Entity | General Ledger |
|---|---|---|
| Ending Balance | 2,200.00 | (2,150.00) |
| (--) Not registered increases | 215.00 | 40.00 |
| 1. Accurate Outstanding Items | 20.00 | 40.00 |
| 2. Inaccurate Outstanding Items | 195.00 | |
| (+) Not registered decreases | 138.00 | 167.00 |
| 1. Accurate Outstanding Items | | 167.00 |
| 2. Inaccurate Outstanding Items | 138.00 | |
| (=) Reconciled Ending Balance | 2,277.00 | (2,277.00) |

| Retention | Processor Name | Proc. Date | Confidentiality |
|---|---|---|---|
| Frequency = M | Approver Name | Approval Date | Form ID |

| Logotype<br>Company Name | | Reconciliation Sheet (RS) | | 261.11 Inter-affiliates accounts<br>31-Mar-10 Currency: $Locals | | | Intercompany<br>Page 1 of 1 | |
|---|---|---|---|---|---|---|---|---|
| Date | Item # | Item Description | Key | Debit | Credit | Type | X-Ref | |
| 1. General Ledger Relationship Entity Outstanding Items | | | | | | | | |
| 26-Dec-09 | 22 | | rrrrrrr8 | 162.00 | | | | |
| 12-Mar-10 | 1 | | rrrrrrr1 | 5.00 | | | | |
| 20-Mar-10 | 14 | | rrrrrrr14 | | 15.00 | | | |
| 29-Mar-10 | 15 | | rrrrrrr15 | | 25.00 | | | |
| Total GL RE Outstandin | | 29-Mar-10 | 4 | 167.00 | 40.00 | | 0 | |
| 2. General Ledger Outstanding Items | | | | | | | | |
| 27-Dec-09 | 23 | | kkkkkkk5 | | | | | |
| 10-Mar-10 | 1 | | kkkkkkk6 | | 195.00 | IE | | |
| 15-Mar-10 | 7 | | kkkkkkk7 | 138.00 | | UN | | |
| 25-Mar-10 | 18 | | kkkkkkk8 | | 20.00 | | | |
| Total Inaccurate Items | | | 4 | 138.00 | 215.00 | | 2 | |
| Total Reconciliation Sheet | | | 8 | 305.00 | 255.00 | | 2 | |
| Retention | Processor Name | | Proc. Initials | | Proc. Date | | Confidentiality | |
| Frequency = M | Approver Name | | Approv. Initials | | Approv. Date | | Form ID | |

Equity

Input documents are shown in FIG. 9 for an equity reconciliation method, which include the following Last Period Reconciliation Sheet (LPRS), Last Period Action Pages (LPAP), Current Period General Ledger (CPGL), and Current Period Historical Ledger (CPHL), input documents 92.

Equity accounts are the most important ledger accounts, as they show shareholders net worth. This methodology proposes the creation and maintenance of historical ledgers to control all equity accounts. The historical ledgers record all movements in the equity accounts, and one historical ledger exists for each equity account. This exemplary equality reconciliation method assumes that one historical ledger exists for every equity account, and they are accurate.

The matching processes 94a are as follows. The first matching sequence involves matching outstanding items on LPRS against CPGL entries. Dash items that match in both documents. Outstanding items related to balance variations between GL and HL should be offset by an adjustment in the General Ledger. Therefore, start the first match by looking to corrections to these types of items and continue with other items like alien entries and incorrect amounts.

The second matching sequence involves comparing the Equity Balance on Current Period General Ledger (CPGL) against the totals of Current Period Historical Ledger (CPHL) by comparing the total in each historical ledger against its respective equity account balance. If these items don't match, add an item in CPRS, otherwise dash both items. The third matching sequence involves matching un-dashed accounting entries on CPGL against other entries in the same document, and dashing both entries that match. Since, equity accounts are so stable regular entries will probably not offset within the same period.

The next processes involve updating 94b. Initially, copy un-dashed items resulted from first match to the GL discrepancy section on the CPRS. Add the investigated components from second match to either GL or to the HL discrepancy section on the CPRS. After finishing copying all un-dashed items, the reconciled balance in the overall reconciliation box must match. If they do not match, go back to the matching procedure and validate if they are all accurately dashed.

For each action item that was successfully closed, the analyst should enter his/her initials and date and do not copy this item to CPAP analyzing 94c and action steps 94d. Next for CPAP, copy unfinished action items from LPAP to the CPAP. For any unexpected entry in these accounts, you need to add an action item in CPAP. Due to the nature of equity accounts, this action item is expected to be cleared up the next month. An exemplary equity reconciliation box and sheet are shown below.

| Logotype | Overall Reconciliation Box | | Equity |
|---|---|---|---|
| Company Name | Reporting Period: | 31-Mar-10 | Page 1 of 1 |

| Reconciliation Elements | | Historical Ledger | General Ledger |
|---|---|---|---|
| Ending Balance | | (22,200.00) | (20,600.00) |
| 1. Accurate Outstanding Items | | | |
|    Cut off Dates | CO | - | (1,200.00) |
| 2. Inaccurate Outstanding Items | | | |
|    Alien Entry | AE | | 100.00 |
|    Incorrect Amount | IA | 6,000.00 | 5,500.00 |
| (=) Reconciled Ending Balance | | (16,200.00) | (16,200.00) |

| Retention | Processor Name | Proc. Date | Confidentiality |
|---|---|---|---|
| Frequency = Q | Approver Name | Approval Date | Form ID |

| Logotype | Reconciliation Sheet (RS) | | 311.11 Capital | | | Equity |
|---|---|---|---|---|---|---|
| Company Name | | | 31-Mar-10 Currency: | $Locals | | Page 1 of 1 |

| Date | Item # | Item Description | Key | Debit | Credit | Type | X-Ref |
|---|---|---|---|---|---|---|---|
| 1. Equity Historical Ledger Outstanding Items | | | | | | | |
| 15-Mar-10 | 6 | | 0 kkkkkkk1 | | 6,000.00 | IA | |
| 16-Mar-10 | 7 | | 0 kkkkkkk2 | | 1,200.00 | CO | |
| Total Equity Historical Items | | | 2 | - | 7,200.00 | | 2 |
| 2. General Ledger Outstanding Items | | | | | | | |
| 15-Mar-10 | 1 | Contribution New Partner A | kkkkkkk3 | | 5,500.00 | IA | |
| 25-Mar-10 | 2 | Dividends 2009 | kkkkkkk4 | | 100.00 | AE | |
| Total General Ledger Items | | | 2 | - | 5,600.00 | | 2 |
| Total Reconciliation Sheet | | | 4 | - | 12,800.00 | | 4 |

| Retention | Processor Name | Proc. Initials | | Proc. Date | Confidentiality |
|---|---|---|---|---|---|
| Frequency = Q | Approver Name | Approv. Initials | | Approv. Date | Form ID |

Non-Transactional Reconciliation Methods
Historical Ledger

Figures 10, 11:
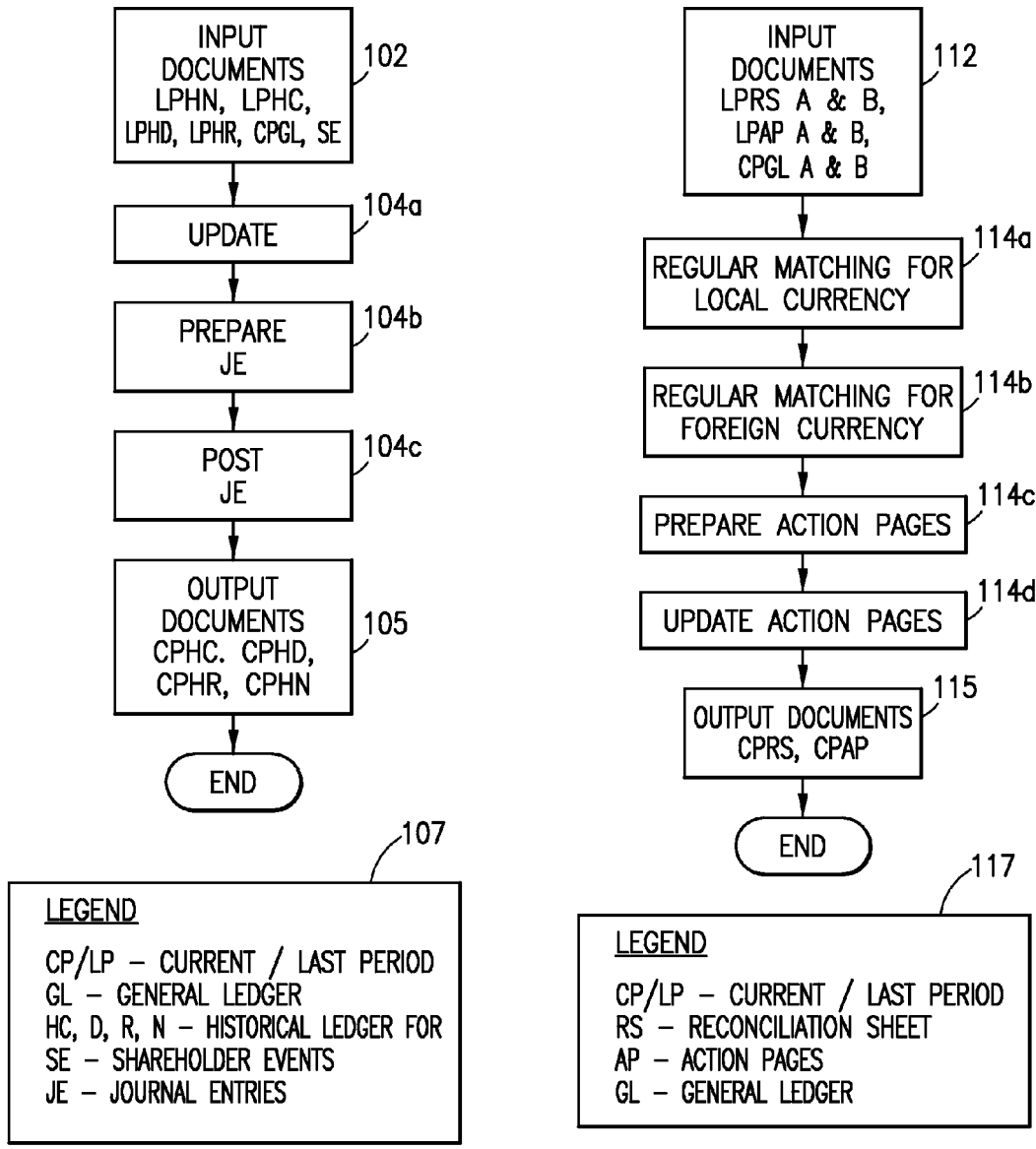
FIG. 10 shows a graphical representation of the historical ledger reconciliation method according to the present invention.
FIG. 11 shows a graphical representation related to foreign transactions and the input documents needed for transactional reconciliation method.

Input documents are shown in FIG. 10 for the historical ledger reconciliation method, which include the following Last Period Historical Ledger for Capital; Dividends; Reevaluation; and Net Income (LPHC, LPHD, LPHR, LPHN); Current Period General Ledger (CPGL) and Shareholder Events (SE), input documents 102. Usual shareholders' documents SE are annual shareholders meeting minutes, dividends proposal from executive committee, company merge and split decisions, and new capital stocks.

The procedure starts by filling the HL 104*a* with data from shareholders events documents and final year-end transactions. Subsequently, you will post the equivalent journal entries to the general ledger, and not the other way around. During the accounting calendar year, enter every shareholder event ordered by date into the historical ledger 104*a*. At the end of each quarter, add the net income entry for the respective quarter or alternatively do it monthly. After adding the net income entry into the historical ledger, proceed to do the related journal entry 104*b* and post it to the general ledger 104*c*.

At year-end, prepare all other accounting entries related to equity events and enter them into the respective historical ledger. Later, post them to the General Ledger. Create a Sub total in CPHL, for every year-end period. The analyst should also create a subtotal for any other period where the books were officially closed, as when a change happens in company accounting calendar.

Final balances of each historical ledger should be copied into the historical summary sheet, one account per line, 105. Next, copy the current balance of the respective ledger account onto the historical summary sheet in the second column. Historical Ledgers usually do not have a CPRS as the outstanding items or discrepancies are presented in the CPRS of the account being reconciled against the HL. Also, HL may not have any Action Pages since all actions are reported and acted upon in the Action Pages for the account being reconciled. An exemplary historical ledger reconciliation box and sheet are shown below.

Compare the two reconciled balances for HL and GL. If they don't match, proceed to review the matching steps.

the entity performing the reconciliation, include Current Period Auxiliary Ledger (CPAL), Current Period Statement of Accounts (CPSA), and Current Period External Reference (CPER).

This method involves a two-step reconciliation process. The usual transactional reconciliation method is considered as primary reconciliation, and the currency related balance

| Logotype<br>Company Name | Overall Reconciliation Box<br>Reporting Period: | | Historical Ledger<br>31-Mar-10 Page 1 of 1 | |
|---|---|---|---|---|
| Reconciliation Elements | | | Historical Ledger | General Ledger |
| Ending Balance | | | 20,400.00 | 20,000.00 |
| 1. Accurate Outstanding Items | | | - | |
| 2. Inaccurate Outstanding Items | | | 800.00 | 1,200.00 |
|    Inconsistent Entries | | IE | 800.00 | 1,200.00 |
|    Excess or lack of Entries | | EL | - | |
|    Incorrect Matching Key | | MK | - | |
|    Unidentified Items | | UN | - | |
| (=) Reconciled Ending Balance | | | 21,200.00 | 21,200.00 |

| Retention | Processor Name | Proc. Date | Confidentiality |
|---|---|---|---|
| Frequency = Q | Approver Name | Approval Date | Form ID |

| Logotype<br>Company Name | Historical Ledger (HL) | | | 161.11 Fixed Assets - Cost<br>31-Mar-10 Currency: | | $Locals | Detailed<br>Page 1 of 1 |
|---|---|---|---|---|---|---|---|
| Date | Item # | Entry Description | | Fiscal Year | Debit | Credit | Balance |
| Beginning Historical Enterprise to Date (ETD) | | | | | | | 10,000.00 |
| 31-Dec-05 | 05 Summ. | New Assets Year | | 2005 | 2,000.00 | | 12,000.00 |
| 31-Dec-05 | 05 Summ. | Retired Assets | | 2005 | | 100.00 | 11,900.00 |
| 31-Dec-06 | 06 Summ. | New Assets Year | | 2006 | 3,000.00 | | 14,900.00 |
| 31-Dec-06 | 06 Summ. | Retired Assets | | 2006 | | 200.00 | 14,700.00 |
| 31-Dec-07 | 07 Summ. | New Assets Year | | 2007 | 2,000.00 | | 16,700.00 |
| 31-Dec-07 | 07 Summ. | Retired Assets | | 2007 | | 3,000.00 | 13,700.00 |
| 31-Dec-08 | 08 Summ. | New Assets Year | | 2008 | 400.00 | | 14,100.00 |
| 31-Dec-08 | 08 Summ. | Retired Assets | | 2008 | | 4,250.00 | 9,850.00 |
| 31-Dec-09 | 09 Summ. | New Assets Year | | 2009 | 6,000.00 | | 15,850.00 |
| 31-Dec-09 | 09 Summ. | Retired Assets | | 2009 | | - | 15,850.00 |
| Historical Prior periods | | | | | 13,400.00 | 7,550.00 | 15,850.00 |
| 28-Feb-10 | 0008 | New Assets - Monthly | | 2010 | - | | 15,850.00 |
| 27-Feb-10 | 0009 | Retired Assets - Monthly | | 2010 | | 800.00 | 15,050.00 |
| 3-Mar-10 | 0010 | New Assets - Monthly | | 2010 | 1,950.00 | - | 17,000.00 |
| 4-Mar-10 | 0011 | Retired Assets - Monthly | | 2010 | | 80.00 | 14,700.00 |
| 10-Mar-10 | 0012 | New Assets Year - Monthly | | 2010 | 3,550.00 | | 16,920.00 |
| 11-Mar-10 | 0013 | Retired Assets - Monthly | | 2010 | | 81.00 | 20,470.00 |
| 15-Mar-10 | 0014 | New Assets Year - Monthly | | 2010 | 75.00 | | 20,464.00 |
| 16-Mar-10 | 0015 | Retired Assets - Monthly | | 2010 | | 64.00 | 20,400.00 |
| Historical Year to Date (YTD) | | | | | 5,575.00 | 1,025.00 | 20,400.00 |
| Historical Enterprise to Date (ETD) | | | | | 18,975.00 | 8,575.00 | 20,400.00 |

| Retention | Processor Name | Proc. Date | Proc. Initials | Confidentiality |
|---|---|---|---|---|
| Frequency = Q | Approver Name | Approv. Date | Approv. Initials | Form ID |

Foreign Currency Accounts

Figure 14:
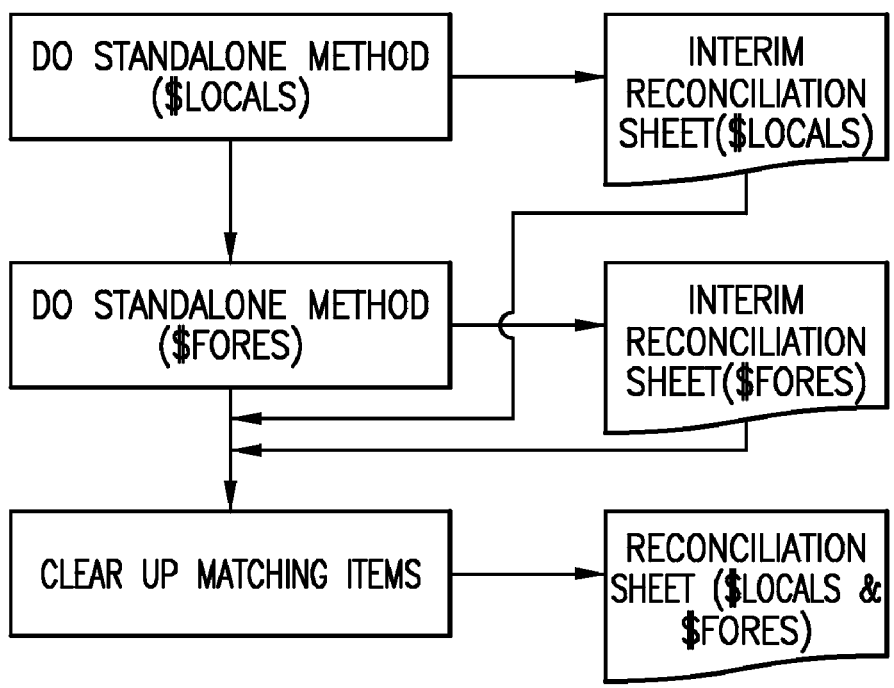
FIG. 14 shows a flow chart of the foreign currency reconciliation method according to the present invention.

Initially, gather supporting documents that are related to the foreign transactions and the input documents needed for the transactional reconciliation method that applies to the ledger account being reconciled. The input documents 112, as shown in FIG. 11, include Last Period Reconciliation Sheet (LPRS), Last Period Action Pages (LPAP), Current Period Reconciliation Sheet (CPRS) and Current Period General Ledger (CPGL). Additional input documents, depending on comparing process is the secondary reconciliation. A diagram of the foreign currency reconciliation method is shown in FIG. 14.

First Reconciliation Step—Regular Matching

First, the analyst selects the transactional reconciliation method that is appropriate for this account. Next, the reconciliation steps are performed for the selected reconciliation method, which needs to be performed twice, one for the local currency ledger 114a and another for the foreign currency ledger 114*b*. The prevailing currency is the foreign currency because the transaction is actually made at this currency.

By doing the reconciliation using the prevailing currency, you are performing a similar reconciliation process made on the foreign company that is having business with yours. Imagine yourself performing the counter-company accountant role. When the matching procedure is finished, and the action pages 114*c* are prepared, the analyst may choose to do the reconciliation adjustment entries in the General Ledger before proceeding to the next reconciliation step if time constraints are an issue, however preferably, the adjustment journal should be done at the end of the second reconciliation step for the local currency ledger and for the prevailing currency ledger.

Second Reconciliation Step—Balance Comparison

The second reconciliation step is a comparison between the ending balances at the prevailing currency and at the ledger currency, converted with the appropriate month-end exchange rate.

RS Template for Foreign Currency Account Reconciliation

A RS with a two-column amount, one for each currency, helps tie an entry in their two currencies, local and prevailing. All lines in the RS must have two amounts one in each column, exception made to the devaluation entry, which occurs only at the local currency column.

Alternative Approach—Reciprocal Ledger

The use of the RS template for foreign currency reconciliation is enough for most companies with relatively few international transactions. For companies with significant international transactions, we recommend the use of the reciprocal ledger. For a detailed description of the reciprocal ledger process, and how to implement it, please refer to the use of reciprocal ledgers later in this chapter.

The processor must then update CPRS where two groups of outstanding items exist, the one from the prevailing currency and the other from the ledger currency. First, the processor must copy all un-dashed outstanding items of prevailing currency LPRS to CPRS and add new un-dashed entries from prevailing currency CPGL to CPRS. For the ledger currency, the processor simply follows the steps listed on the chosen transactional reconciliation method.

Finally, the action pages should be updated, 114*d* for each action item that was successfully closed by initialing and dating. These items should not be copied to CPAP. Finally, output documents are created, 115. First, the analyst copies unfinished action items from LPAP to the CPAP. For every new outstanding item that needs further investigation, requires management actions, or it is not clear enough, add an action item to CPAP. An exemplary foreign currency reconciliation box and sheet are shown below.

Compare the two reconciled balances for prevailing and reporting currency. If they don't match, proceed to review the matching steps.

| Logotype | | Overall Reconciliation Box | Foreign Currency |
|---|---|---|---|
| Company Name | Reporting Period: | | Page 1 of 1 |

| Reconciliation Elements | | Prevailing Currency | Reporting Currency |
|---|---|---|---|
| Ending Balance | | 1,040.00 | 2,270.00 |
| Less: Inaccurate Outstanding items | | 20.00 | (120.00) |
|    Inconsistent Entries | IE | - | (200.00) |
|    Excess or lack of Entries | EL | 100.00 | - |
|    Incorrect Matching Key | MK | (80.00) | 100.00 |
|    Unidentified Items | UN | - | (20.00) |
| Less: Accurate Ending Balances | | | 50.00 |
| | | | |
| Equal: Accurate Ending Balances | | 1,060.00 | 2,100.00 |
|    Divided by: Exchange Rate | | 1.00 | 2.00 |
| Translated Accurate Balance | | | 2,120.00 |
|    Devaluation on accurate balances | | | (20.00) |
| (=) Reconciled Ending Balance | | 1,060.00 | 2,120.00 |
| Exchange Rate Check ($) | | | TRUE |

| Retention | Processor Name | Proc. Date | Confidentiality |
|---|---|---|---|
| Frequency = M | Approver Name | Approv. Date | Form ID |

| Logotype | | Reconciliation Sheet (RS) | | 221.12 Foreign Accounts Payable | | Standalone | |
|---|---|---|---|---|---|---|---|
| Company Name | | | | 31-Mar-10 $Fores  $Locals | | Page 1 of 1 | |
| Date | Item # | Item Description | Prevailing | Reporting Dr | Reporting Cr | Type | X-Ref |
| 1. Accurate Outstanding Items | | | | | | | |
| 3-Feb-10 | 0010 | xxxxxxxxxx1 | 1,060.00 | | 2,300.00 | | 0004 |
| 4-Feb-10 | 0011 | xxxxxxxxxx2 | (100.00) | 200.00 | | | 0004 |
| Total Accurate Items | | 2 | 1,060.00 | 200.00 | 2,500.00 | | 0 |
| Booked Devaluation Entry | | | | | 50.00 | | |
| 2. Inaccurate Outstanding Items | | | | | | | |
| 4-Feb-10 | 0012 | xxxxxxxxxx3 | | | 2,000.00 | IE | |
| 5-Feb-10 | 0013 | xxxxxxxxxx4 | | 1,800.00 | | IE | |
| 6-Mar-10 | 0014 | xxxxxxxxxx5 | 50.00 | | | EL | |
| 7-Mar-10 | 0015 | xxxxxxxxxx6 | (150.00) | | | EL | |
| 8-Mar-10 | 0016 | xxxxxxxxxx7 | 200.00 | | 400.00 | MK | |
| 9-Mar-10 | 0017 | xxxxxxxxxx8 | (120.00) | 500.00 | | MK | |
| 10-Mar-10 | 0018 | xxxxxxxxxx9 | | | 10.00 | UN | |
| 11-Mar-10 | 0019 | xxxxxxxxxx10 | | | 10.00 | UN | |
| Total Inaccurate Items | | 8 | (20.00) | 2,300.00 | 2,420.00 | | 8 |
| Total Reconciliation Sheet | | 10 | 1,040.00 | 2,500.00 | 4,770.00 | | 8 |
| Retention | Processor Name | | Proc. Initials | | Proc. Date | Confidentiality | |
| Frequency = Q | Approver Name | | Approv. Initials | | Approv. Date | Form ID | |

Dual Currency Ledgers

Figure 12:
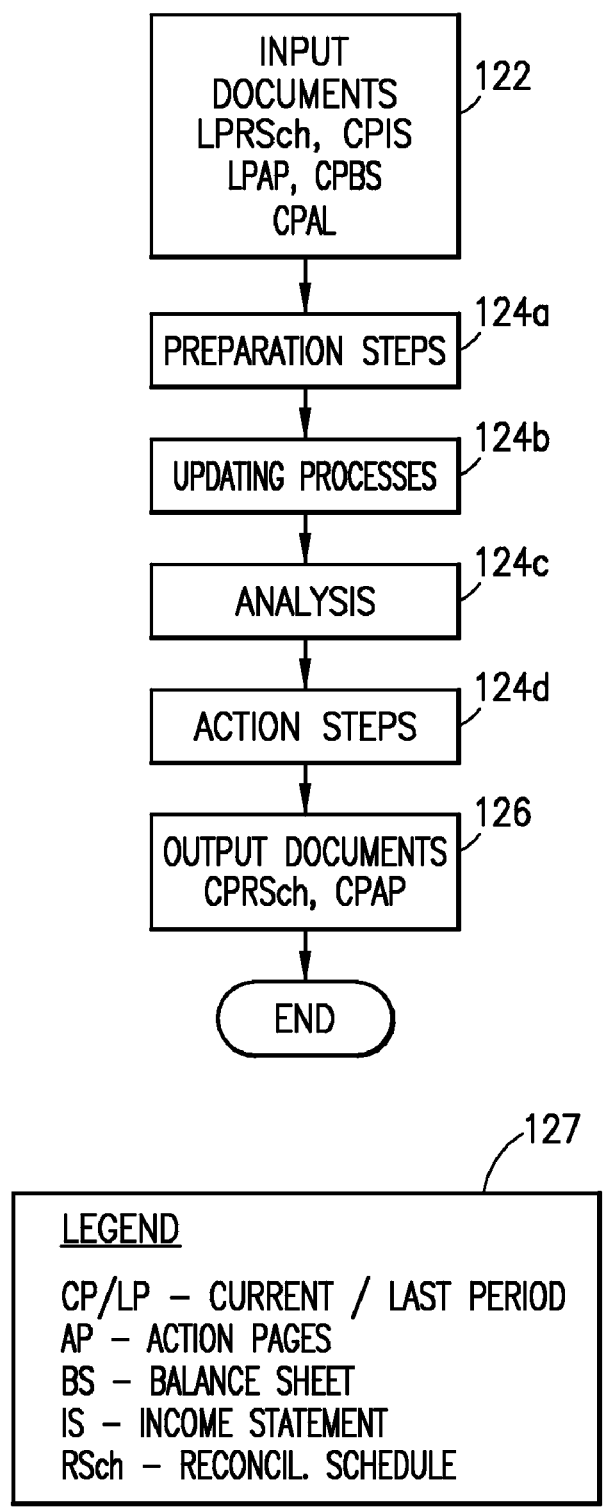
FIG. 12 shows a graphical representation for input documents initially gathered for dual currency ledgers.

Input documents 122 are initially gathered as shown in FIG. 12. The input documents 122 include Last Period Reconciliation Schedule (LPRSch), Last Period Action Pages (LPAP), Current Period Auxiliary Ledger (CPAL)—Reserves Schedules, Monetary Re-expression, Revaluation Form, Depreciation Sheets, Current Period Income Statement in Currency A & in Currency B (CPIS), and Current Period Balance Sheet in Currency A & in Currency B (CPBS).

Matching Procedure

Overall Description

The key idea behind this reconciliation method is to walk from the Profit-Before-Taxes (PBT) of two disparate accounting principles, toward a PBT of a most common accounting principle, thus allowing to validate the proper use of an average exchange rate for the Financial Statement translation, preparation steps 124a.

The journey starts with the two PBT from the Ledger in currency A and Ledger in currency B. The first stop in the journey is after the extraction of the effects of uncommon accounting principles from each Ledger PBT. Schedule A has the uncommon accounting principles document. Now, both PBT are under the same accounting principles.

The next step in the journey is after extracting the principles that, although common, have different application criteria. The different application criteria are documented in the schedule B. At this point, both PBT are under the same accounting principles and with the same application criteria. The translation process can now be checked and the translation variation can be determined. Use schedule C to determine the translation variation.

Figure 15:
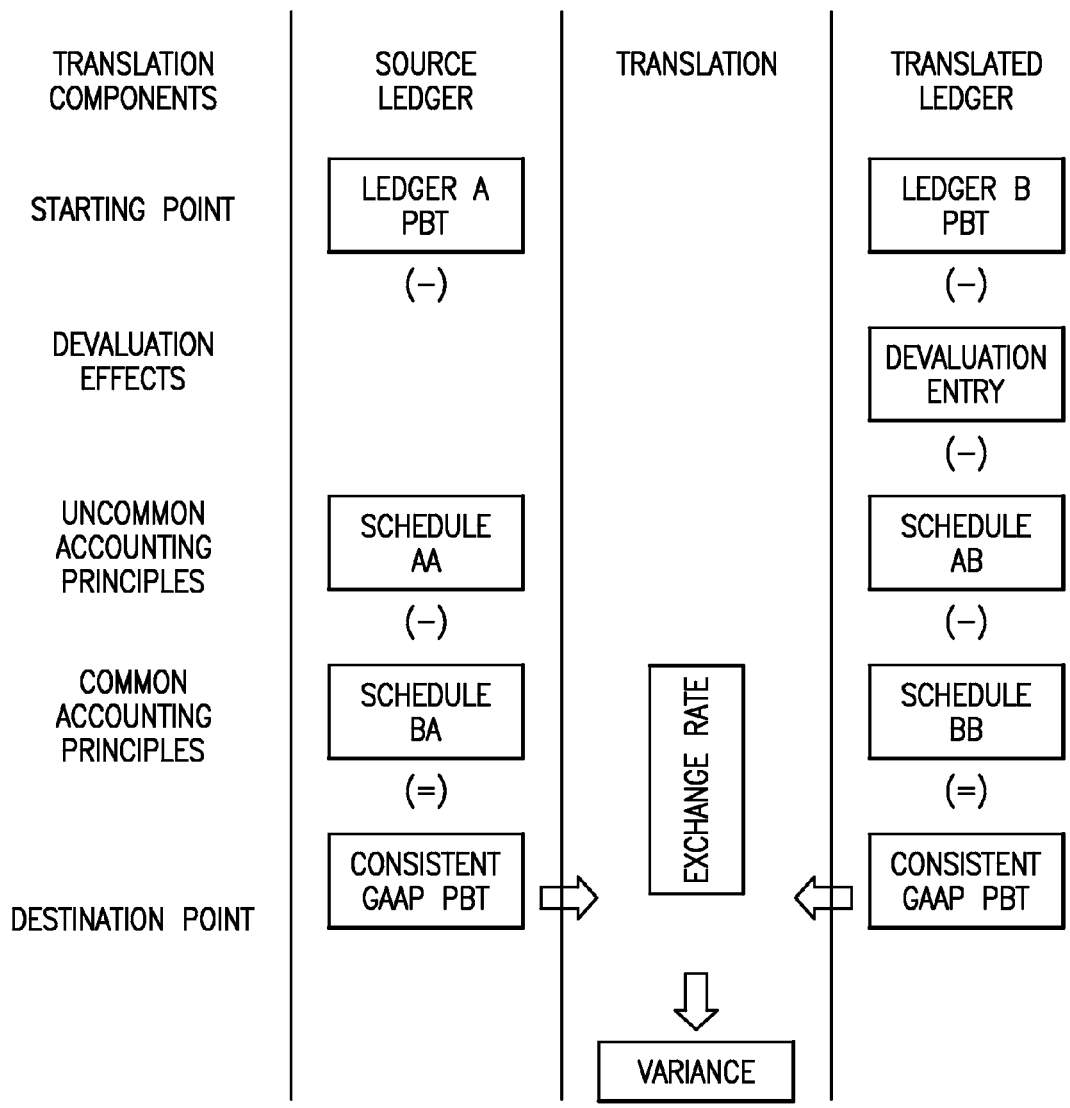
FIG. 15 reconciliation block diagram according to the present invention.

The causal analysis for the translation variation, identified within the schedule D, serves to perform corrective actions, on each of the two Ledgers. A reconciliation block diagram is shown in FIG. 15.

Defining the Uncommon and Common Accounting Categories

Defining the Uncommon Categories

Even before the processor fills out the Schedule A for the first time, the analyst needs to define the uncommon categories of the schedule. The uncommon categories are very stable as they depend on the accounting principles that govern the two ledgers, and fortunately, they do not change so often. To arrive to a comprehensive list of categories, the approver must take into account the opinion of other accountants in the company because the knowledge about uncommon categories are usually scattered throughout a company.

It is also advisable to validate the uncommon categories with the internal controls department and with external auditors, to get additional input for any forgotten item. One example of an uncommon principle is revenue recognition, as the criteria for booking is proprietary for each country and for each company type.

Defining the Common B Categories

Schedule B has more line items than schedule A, so it is even more important to classify them by category. Most frequent categories are Depreciation/Amortization, and Reserves. For other significant categories, create individual categories for them. An example of this category is Inventory consumption where some companies use the historical cost of goods for the translated ledger. All other items of less significance should be classified as "All other." This schedule is where you capture most inconsistencies because their components are repetitive, and being repetitive, they do not draw too much attention.

The Schedule A—Uncommon Accounting Principles

Filling the Schedule Out

After defining the categories, the processor must start to fill the amounts in the Schedule A. After completing the schedule A, and analyzing it, some missing categories will come up and this is absolutely the expected outcome during the first months of implementation.

The amount in each category needs a supporting document and/or a link to its occurrence in the General Ledger or Auxiliary Ledger. The amount cannot be an orphan; it must show the proper source. The processor needs to fill out the categories for ledger A and ledger B.

| Logotype | | 321.11 Net Income | | Profit on dual currency | |
|---|---|---|---|---|---|
| Company Name | | | | 31-Mar-10 Page 1 of 1 | |
| Dual Currency Schedule A - Uncommon Accounting Principles ||||||
| Date | Item # | Item Description | | Reference | Amount |
| Ledger A ||||||
| Category I ||||||
| 7-Mar-10 | nnnnn | xxxxxxxxxx | | kkkkkkk | 500.00 |
| 8-Mar-10 | nnnnn | xxxxxxxxxx | | kkkkkkk | 500.00 |
| Category II ||||||
| 10-Mar-10 | nnnnn | xxxxxxxxxx | | kkkkkkk | 500.00 |
| 11-Mar-10 | nnnnn | xxxxxxxxxx | | kkkkkkk | 500.00 |
| Total Ledger A | | | | Amount AA==> | 2,000.00 |
| Ledger B ||||||
| Category III ||||||
| 13-Mar-10 | nnnnn | xxxxxxxxxx | | kkkkkkk | 200.00 |
| 14-Mar-10 | nnnnn | xxxxxxxxxx | | kkkkkkk | 200.00 |
| Category IV ||||||
| 21-Mar-10 | nnnnn | xxxxxxxxxx | | kkkkkkk | 200.00 |
| 22-Mar-10 | nnnnn | xxxxxxxxxx | | kkkkkkk | 200.00 |
| Total Ledger B | | | | Amount AB==> | 800.00 |
| Retention | | Processor Name | | Proc. Date | Confidentiality |
| Frequency = Q | | Approver Name | | Approval Date | Form ID |

Schedule B—Common Accounting Principles, Different Application Criteria

Filling the Schedule Out

Copy the amounts from the supporting documents to every category in Ledger A frame, and then do the same for Ledger B frame.

| Logotype | | 321.11 Net Income | | Profit on dual currency | |
|---|---|---|---|---|---|
| Company Name | | | | 31-Mar-10 Page 1 of 1 | |
| Dual Currency Schedule B - Uncommon Accounting Principles ||||||
| Date | Item # | Item Description | | Reference | Amount |
| Ledger A ||||||
| Depreciation | | | | Amount BA1==> | 600.00 |
| 8-Mar-10 | nnnnn | xxxxxxxxxx | | kkkkkkk | 200.00 |
| 9-Mar-10 | nnnnn | xxxxxxxxxx | | kkkkkkk | 200.00 |
| 10-Mar-10 | nnnnn | xxxxxxxxxx | | kkkkkkk | 200.00 |
| Reserves | | | | Amount BA2==> | 750.00 |
| 11-Mar-10 | nnnnn | xxxxxxxxxx | | kkkkkkk | 250.00 |
| 12-Mar-10 | nnnnn | xxxxxxxxxx | | kkkkkkk | 250.00 |
| 13-Mar-10 | nnnnn | xxxxxxxxxx | | kkkkkkk | 250.00 |
| Other | | | | Amount BA3==> | 900.00 |
| 14-Mar-10 | nnnnn | xxxxxxxxxx | | kkkkkkk | 300.00 |
| 15-Mar-10 | nnnnn | xxxxxxxxxx | | kkkkkkk | 300.00 |
| 16-Mar-10 | nnnnn | xxxxxxxxxx | | kkkkkkk | 300.00 |
| Total Ledger A | | | | Amount BA==> | 4,500.00 |

-continued

| Ledger B | | | | |
|---|---|---|---|---|
| Depreciation | | | Amount BB1==> | 210.00 |
| 22-Mar-10 nnnnn | xxxxxxxxxx | | kkkkkkk | 70.00 |
| 23-Mar-10 nnnnn | xxxxxxxxxx | | kkkkkkk | 70.00 |
| 24-Mar-10 nnnnn | xxxxxxxxxx | | kkkkkkk | 70.00 |
| Reserves | | | Amount BB2==> | 300.00 |
| 25-Mar-10 nnnnn | xxxxxxxxxx | | kkkkkkk | 100.00 |
| 26-Mar-10 nnnnn | xxxxxxxxxx | | kkkkkkk | 100.00 |
| 27-Mar-10 nnnnn | xxxxxxxxxx | | kkkkkkk | 100.00 |
| Other | | | Amount BB3==> | 360.00 |
| 28-Mar-10 nnnnn | xxxxxxxxxx | | kkkkkkk | 120.00 |
| 29-Mar-10 nnnnn | xxxxxxxxxx | | kkkkkkk | 120.00 |
| 30-Mar-10 nnnnn | xxxxxxxxxx | | kkkkkkk | 120.00 |
| Total Ledger B | | | Amount BB==> | 1,740.00 |

| Retention | Processor Name | | Proc. Date | Confidentiality |
|---|---|---|---|---|
| Frequency = Q | Approver Name | | Approval Date | Form ID |

Update CPRSch

Schedule C—Block Reconciliation with Consistent PBT

Copy PBT from Income Statement of Ledger A and from Ledger B to the respective cells in schedule C. Copy total amounts from schedule A and schedule B, to the appropriate lines in schedule C. Here, two new PBT, with fully consistent accounting principles show up. Now, it is possible to translate the PBT with Ledger @ currency A, using your company average exchange rate into the Ledger @ currency B.

| Logotype | Schedule C - Overall Reconciliation Box | | Dual Currency |
|---|---|---|---|
| Company Name | Reporting Period: | 31-Mar-10 | Page 1 of 1 |

| Consistent Principles PBT reconciliation | PBT from Ledger B | PBT from Ledger A |
|---|---|---|
| Current period PBT | 1,300.00 | 3,320.00 |
| Less: Schedule A | | |
| Ledger A | | 2,000.00 |
| Ledger B | 800.00 | |
| Less: Schedule B | 870.00 | 2,250.00 |
| Depreciation | 210.00 | 600.00 |
| Reserves | 300.00 | 750.00 |
| Other | 360.00 | 900.00 |
| Equal: Consistent Principle PBT | 2,970.00 | 7,570.00 |
| Divided by: Exchange Rate | 1.00 | 2.00 |
| Plus: Translated Consistent PBT | 3,785.00 | 7,570.00 |
| Discrepancy ($) | (815.00) | |
| (=) Reconciled Ending Balance | 3,785.00 | 7,570.00 |
| Exchange Rate Check ($) | | TRUE |

| Retention | Processor Name | Proc. Date | Confidentiality |
|---|---|---|---|
| Frequency = Q | Approver Name | Approval Date | Form ID |

Schedule D—Causal Analysis

Filling the Schedule Out

No need to fill out this schedule as it inherits the amount from the initial schedules A, B, and C.

Analyzing the Causal

If the percentage variation between the two consistent PBT from the two ledgers is less than 10% of current month devaluation rate, the causal analysis may stop, since the variation is mostly attributable to previous month entries only booked this month and to adjustment entries. If the percentage is higher than 10%, a causal analysis document must be prepared, which will yield the causal items. For every causal item, an action item must be created for its investigation, solution, and mitigation.

When the total of causal items added to the remaining variation is smaller than the target percentage, 10% in this case, you may want to stop the causal analysis. Nothing should impede the analyst to carry out the causal analysis further after the target has been reached. The recommendation is to achieve the first target and later if you will, concentrate in refining it increasingly.

The schedule A contains the outstanding items, which in this case are aggregated accounting items, not detailed entries, update 124b. Usually the processor does not report a specific accounting entry in schedule A. However, if it is relevant it should be recorded in the Action Pages from a discrepancy analysis 124c.

Update Action Pages

Each action item listed on LPAP that was finished in the current period should be initialized and dated. Copy all unfinished action items from LPAP to a blank action page sheet, the CPAP. Some action items may not result in the elimination of an outstanding item. They may be clarification actions or information seeking. For every new outstanding item listed on CPRS, you must create an action item in the CPAP 126. An exemplary dual currency set of schedules are shown below.

| Logotype | | 321.11 Net Income | Profit on dual currency |
|---|---|---|---|
| Company Name | | | 31-Mar-10 Page 1 of 1 |
| Dual Currency Schedule D - Causal Analysis ||||
| Date | Item # Item Description | Reference | Amount |
| Discrepancy Amount | | | (815.00) |
| Discrepancy % | | | -22% |
| Ledger A | | | |
| 3-Mar-10 nnnnn | xxxxxxxxxx | kkkkkkk | 100.00 |
| 4-Mar-10 nnnnn | xxxxxxxxxx | kkkkkkk | 200.00 |
| 5-Mar-10 nnnnn | xxxxxxxxxx | kkkkkkk | 300.00 |
| Total Ledger A | | Amount AA==> | 600.00 |
| Ledger B | | | |
| 11-Mar-10 nnnnn | xxxxxxxxxx | kkkkkkk | 50.00 |
| 12-Mar-10 nnnnn | xxxxxxxxxx | kkkkkkk | 150.00 |
| 13-Mar-10 nnnnn | xxxxxxxxxx | kkkkkkk | 200.00 |
| Total Ledger B | | Amount AB==> | 400.00 |
| Total Ledger A @ Currency B | | | 300.00 |
| Causal Total | | | 700.00 |
| New Discrepancy Amount | | | (115.00) |
| New Discrepancy % | | | -3% |
| Retention | Processor Name | Proc. Date | Confidentiality |
| Frequency = Q | Approver Name | Approval Date | Form ID |

Further Improving Accuracy
Balances Confirmation Procedure

Why companies do external benchmark for their business functions? Because even a well revised internal process, may be vicious after several years of improving it repeatedly. Therefore, use of balance confirmation with other parties improves the level of certainty in our financial statements. By acting promptly when doing this confirmation, users may prevent future write off, as the accounting events are still fresh in everyone's mind. However, some entries that would only be written off in the future maybe captured now when doing the balance confirmation. The anticipation of a write off reinforces the accrual accounting principle.

How to do Balances Confirmation

The company sends an official letter to a third party informing company objectives with this request, attaching a form or report showing open items that relate to the third party. The report must show enough detailed elements to ease the confirmation by the third party. You must define the scope, frequency, and the resources to perform these duties in order to generate predictable results.

Balance confirmation is a procedure often used by auditors in fieldwork. They call up some parties that operate with the audited company to confirm account balances.

Balance Confirmation Document Types
Receivables and Payables Statements Confirmation
    To customers
    To suppliers
    To employees
Investments Confirmation
    To investors
    To shareholders
    To parent companies Assets Held by Employees and Partners
    Petty cash
    Mobile assets
    Advances
    Inventory
Confirmation Letter Template

| To: | From: |
|---|---|
| Subject: | Date: |

| Reference: |
|---|

| Requestor's description: |
|---|

| Summarized requested data[1] | | |
|---|---|---|
| Month/Year | Category | Amount |
| | | |
| | | |
| | | |
| | | |

-continued

| Attachment Documents[2] | Hard Copy | Soft Copy |
|---|---|---|
| Confirmation Letter-Answer | Fax-ready document | PDF |
| Return Medium | Stamped envelope | Secure Word document |
| Supporting Documents | Physical Copy | Scanned copy |

(1) Detailed data shown in confirmation letter answer. (2) Electronic emails should have an electronic signature provided by a signature authentication company.

| To: | From: |
|---|---|
| Subject: | Date: |

| Reference: |
|---|
| Requestor's answer description: |

| Detailed request confirmation | | | | | | |
|---|---|---|---|---|---|---|
| Source data | | | | Confirmation data | | |
| Date: | Reference | Description | Amount | Ref# | Amount | Check |
| 02/12/10 | | | 999.99 | | 999.99 | Ok |
| | | | 999.99 | | 999.98 | No |
| | | | 999.99 | | 0 | No |
| | | | 999.99 | | 999.99 | Ok |
| | | | 999.99 | | 999.99 | Ok |
| | | | 999.99 | | 999.99 | Ok |
| | | | 999.99 | | 999.99 | Ok |
| | | | 999.99 | | 999.99 | Ok |
| | | | 999.99 | | 999.99 | Ok |
| | | | 999.99 | | 999.99 | Ok |
| Total | 10 | | 9999.9 | 9 | 8999.9 | 8 |
| Variation | | | | 1 | 1,000 | 2 |
| Supporting Documents | | Physical Copy | | Scanned copy | | |

Reciprocal Ledgers
Reciprocal Ledgers Description
Objectives
The objectives of a reciprocal ledger are:
  To calculate accurately the devaluation entry for a ledger account governed by a foreign currency
  To have a solid reference @ foreign currency, to support ledger account balance @ ledger currency
  To ease the matching process between documents expressed on a foreign currency and a ledger account using the same currency.
Building the Reciprocal Ledger
  A reciprocal ledger in foreign currency should be built to hold the foreign currency ledger accounts. Each account governed by foreign currency will participate in the reciprocal ledger. On the contrary, accounts governed by local ledger currency must not participate.
  It is easy to note that an imbalance will show up in the reciprocal ledger, as some foreign accounting entries are offset by a local currency entry that was not transferred to the reciprocal ledger. To balance the ledger, an offset account is required at the reciprocal ledger, to hold the equivalent entries of the local transaction. An example illustrates the concept.
  A company takes a loan in Euros to be repaid in Euros with the money supplied in local currency. The loan account is controlled in foreign currency and the cash account is controlled in local currency. The reciprocal ledger carries only the loan portion, and not the cash portion. The reciprocal ledger is not supposed to carry local currency accounting entries, as these entries do not need a reciprocal ledger to better control its accuracy. From an opposite view, the main ledger would be the document that reflects all transactions either in local currency or in foreign currency.
How Many Reciprocal Ledgers to Use
  The foreign transactions of a company usually happen with a few currencies, unless it is an international trade company. It therefore makes sense to have a reciprocal ledger for each of these currencies. However, the transaction level on each currency is a factor that influences the decision of how many reciprocal ledgers your company need. A small transaction volume in one currency may not justify the creation of a reciprocal ledger.
  This methodology recommends the use of reciprocal ledgers to control foreign currency transactions, whenever they happen with an expected frequency for regular company operations. For the isolated foreign currency transactions that are not controlled by a reciprocal ledger, the analyst can instead do a spreadsheet to control only the foreign currency account, and register the related debit/credit entries in foreign currency.
Full Reflection on the Reciprocal Ledger
  If the approver wants to go further to have a full reflection of all journal entries for foreign transactions in the reciprocal ledger, just keep in mind that the primary objective of a reciprocal ledger is to support the accuracy of the foreign currency accounts in your main ledger. If the approver decides to have a comprehensive foreign reciprocal ledger, the analyst must categorize the reciprocal accounts in order to identify which ones are reciprocal control accounts, and which ones are foreign transactions tracking account. This categorization helps to filter the accounts used by you and auditors to validate accuracy in the main ledger.
The Exchange Rate to Register
  What is the best exchange rate to use to register an accounting event, in order to maximize accuracy? The loans taken or paid should be registered with an exchange rate that will ease the reconciliation matching procedure. We recommend using the same exchange rate used by the finance institution to determine the local amount to be paid, instead of using an average or period-end exchange rate, which would generate a new unknown amount. By doing it this way, the two involved amounts (Foreign and Local) match perfectly the amounts in the contractual terms and in the statement of accounts.
Reciprocal Ledgers Examples
A Detailed Example of Main Ledger and Reciprocal Ledger
  For the purpose of this example, let's name the foreign currency as $Fore, and the local currency as $Local. A loan was taken in $Fore and it was paid out with two installments, one with local currency, and the other with the foreign currency. The loan was taken on 1 Oct. 2005, for an amount of F$100 and it was paid on 1 Nov. 2005. The exchange rate was $1.10 at the inception, $1.20 at the second payment, and $1.30 at the last payment. A credit was made to the checking account by L$110, a payment was performed later by L$120 from the same checking account, and a final payment was done by F$100 from a foreign currency checking account. On October 31 and November 30, the company issues its Financial Statements and need to show an updated debt.

To simplify the example, all interest is paid at the end of the loan. See below the accounting effects in both the main ledger and reciprocal ledger.

1. Loan taken by F$100 and deposited in $L on Oct. 1, 2005
2. Devaluation entry on Oct. 31, 2005 (This entry only affects the local ledger).
3. Loan repayment of F$100 with $L on Nov. 1, 2005
4. Devaluation entry on Nov. 30, 2005 (This entry only affects the local ledger).
5. Loan repayment of F$100 with $F on Dec. 1, 2005
6. Interest of F$3 paid on Dec. 1, 2005 with $F.=$200×1 month+$100×1 month.

Journal entries:

| Entry # | Date | Exc. Rate | Local account | Debit | Credit | Reciprocal account | Debit | Credit |
|---|---|---|---|---|---|---|---|---|
| 1 | 1 Oct. | 1.10 | Checking 1 | 220 | | Asset offset | 200 | |
| | | | Loan | | 220 | Loan | | 200 |
| 2 | 31 Oct. | 1.20 | OI&D - devaluation | 20 | | — | — | |
| | | | Loan | | 20 | — | | — |
| 3 | 1 Nov. | 1.20 | Loan | 120 | | Loan | 100 | |
| | | | Checking 1 | | 120 | Asset offset | | 100 |
| 4 | 30 Nov. | 1.30 | OI&D - devaluation | 10 | | — | — | |
| | | | Loan | | 10 | +13 Loan | | — |
| 5 | 1 Dec. | 1.30 | Loan | 130 | | Loan | 100 | |
| | | | Checking 2 | | 130 | Checking 2 | | 100 |
| 6 | 1 Dec. | 1.30 | OI&D - Interest | 3.9 | | OI&D - Interest | 3 | |
| | | | Checking 2 | | 3.9 | Checking 2 | | 3 |

T-Accounts for the above example

Locals (L$)

Loan

| | | |
|---|---|---|
| 1 Oct. | | $220 [1] |
| 31 Oct. | $20 [2] | |
| 1 Nov. | $120 [3] | $10 [4] |
| 30 Nov. | | |
| 1 Dec. | [5] | |

Checking 1

| | | |
|---|---|---|
| 1 Oct. | $220 [1] | |
| 31 Oct. | | $120 [3] |
| 1 Nov. | | |
| 30 Nov. | | |

Checking 2

| | | |
|---|---|---|
| 1 Oct. | $220 [1] | |
| 31 Oct. | | |
| 1 Nov. | | |
| 30 Nov. | | $130 [5] |
| 1 Dec. | | $3.9 [6] |

O&ID - Interest

| | |
|---|---|
| 1 Oct. | |
| 31 Oct. | |
| 1 Nov. | |
| 30 Nov. | |
| 1 Dec. | $3.9 [6] |

O&ID - Devaluation

| | |
|---|---|
| 1 Oct. | |
| 31 Oct. | $20 [2] |
| 1 Nov. | |
| 30 Nov. | $10 [4] |

Fores (F$)

Loan

| | | |
|---|---|---|
| 1 Oct. | | $200 [1] |
| 31 Oct. | | |
| 1 Nov. | $100 [3] | |
| 30 Nov. | | |
| 1 Dec. | [5] | |

Assets offset

| | | |
|---|---|---|
| 1 Oct. | $200 [1] | |
| 31 Oct. | | $100 [3] |
| 1 Nov. | | |

Checking 2

| | | |
|---|---|---|
| 1 Oct. | | |
| 31 Oct. | | |
| 1 Nov. | | |
| 30 Nov. | | |
| 1 Dec. | | $100 [5] |
| | | $3 [6] |

O&ID - Interest

| | |
|---|---|
| 1 Oct. | |
| 31 Oct. | |
| 1 Nov. | |
| 30 Nov. | |
| 1 Dec. | $3 [6] |

Other Examples of Journal Entries in Foreign Currency

| 1. Sales invoiced in foreign currency | | | | |
|---|---|---|---|---|
| Dr | Accounts Receivable | 100 | Accounts Receivable | 10 |
| Cr | Sales Revenue | 100 | Revenue Offset | 10 |
| Dr | Cost of Revenue | 80 | | None |
| Cr | Inventory | 80 | | None |

The accounts receivable entry goes to the equivalent account in the reciprocal ledger.

The revenue entry goes to a revenue-offset account in the reciprocal ledger, as there is no need to reconcile it against the equivalent account in the main ledger.

The cost and the inventory journal entries don't need to be reflected in the reciprocal ledger as none of them are involved with a foreign currency.

This explanation serves to the examples that follow unless otherwise noted.

2. Cash received in foreign currency from local receivables

| | | | | |
|---|---|---|---|---|
| Dr | Cash on hand Foreign | 100 | Cash on hand Foreign | 10 |
| Cr | Local Receivable | 100 | Assets Offset | 10 |

3. Cash received in foreign currency from foreign receivables

| | | | | |
|---|---|---|---|---|
| Dr | Cash on hand Foreign | 100 | Cash on hand Foreign | 10 |
| Cr | Foreign Receivable | 100 | Foreign Receivable | 10 |

4. Cash received in local currency from local receivables

| | | | | |
|---|---|---|---|---|
| Dr | Cash on hand | 100 | | None |
| Cr | Local Receivable | 100 | | None |

5. Write off a foreign currency receivable

| | | | | |
|---|---|---|---|---|
| Dr | Receivables Reserve-Foreign | 100 | Receivables Reserve-Foreign | 10 |
| Cr | Accounts Receivable-Foreign | 100 | Accounts Receivable-Foreign | 10 |

6. Write off a local currency receivable

| | | | | |
|---|---|---|---|---|
| Dr | Receivables Reserve | 100 | | None |
| Cr | Accounts Receivable | 100 | | None |

7. Prepaid Expenses—Paid with Foreign funds

| | | | | |
|---|---|---|---|---|
| Dr | Prepaid assets | 100 | Assets Offset | 10 |
| Cr | Cash on hand Foreign | 100 | Cash on hand Foreign | 10 |

8. Amortization of prepaid assets

| | | | | |
|---|---|---|---|---|
| Dr | Expenses | 100 | | None |
| Cr | Prepaid assets | 100 | | None |

9. Inventory transfer

| | | | | |
|---|---|---|---|---|
| Dr | Inventory A | 100 | | None |
| Cr | Inventory B | 100 | | None |

10. Inventory write off

| | | | | |
|---|---|---|---|---|
| Dr | Inventory Reserves | 100 | | None |
| Cr | Inventory | 100 | | None |

11. Fixed Assets purchased in foreign currency

| | | | | |
|---|---|---|---|---|
| Dr | Inventory Reserves | 100 | | None |
| Cr | Inventory | 100 | | None |

12. Fixed Assets purchased in local currency

| | | | | |
|---|---|---|---|---|
| Dr | Fixed Assets | 100 | | None |
| Cr | Accounts Payable | 100 | | None |

Chart of Accounts for Reciprocal Ledger

Below is a chart of accounts with a few regular accounts to present the concept of Offset accounts.

| Assets | Liabilities |
|---|---|
| Assets Offset | Liabilities Offset |
| Checking | Loans |
| Time Deposit | Accounts Payable |
| Accounts Receivable | Salaries Payable |
| Inventory | Payroll Expenses |
| Fixed Assets | |
| Other Long Term Assets | Other Long Term Liabilities |
| | Equity Offset |
| | Equity |
| Cost, Expenses, and Taxes | Revenue and OI&D |
| Cost/Expenses Offset | Revenue/OI&D Offset |
| Cost of Revenue | Revenue |
| Expenses | OI&D |
| Taxes | |

User Access Control on Ledger Accounts

Description

By implementing a process to restrict user access over ledger accounts, will deter surprising entries, usually wrong or insufficiently identified. To implement this control successfully, all users and automated systems that do entries in the general ledger must be fully qualified and categorized, so you can control the access to each ledger account to one person or system or a group of people.

Equity accounts are a clear example of accounts that should be very restricted, and can be done easily. A more complex situation happens on the Accounts Receivable account, where the following resources are potential candidates to operate it: Collectors, account analyst, billing analyst, billing system, collection system, among others. The fewer operators allowed to do account maintenance; the better is the accuracy and accountability. Right out of the box, a General Ledger system doesn't provide a mechanism to restrict access to a ledger account to a specific person or a group of persons. This deficiency leads to a loose control environment for the ledger account allowing any accountant or automated system to do entries on it.

Output Supporting Documents—Form Layout

Write Off—Form Layout

| Logotype | | Write off proposal and approval (WO) | | | | |
|---|---|---|---|---|---|---|
| Company Name | Reporting Period: | 31-Mar-10 Currency: | | $Locals | | Page 1 of 1 |

| Account # | Account Name | Entry date | Reference # | Description | P&L Impact | Justification |
|---|---|---|---|---|---|---|
| 1. Accurate Items | | | | | | |
| 121.11 | Trade Receivable | 23-May-09 | Invoice #2345 | Supplies Sale | 150.00 | Customer never got the Supplies |
| 151.12 | Advances to employees | 12-Jun-09 | ID 23-2009 | Travel advance | 25.00 | Employee left the company |
| Total Accurate Items | | 2 | | | 175.00 | |
| 2. Inaccurate Items | | | | | | |
| 141.12 | Finished Goods | 5-Dec-09 | Vendor Inv. V-011 | Inventory Transfer | 125.00 | Too costly to identify it |
| Total Inaccurate Items | | 1 | | | 125.00 | |
| Total Write off proposal | | 3 | | | 300.00 | |

| Retention | Processor Name | Proc. Initials | Proc. Date | Confidentiality |
|---|---|---|---|---|
| Frequency | Approver Name | Approv. Initials | Approv. Date | Form ID |

| Logotype | | Action Pages (AP) | | | | Summary | |
|---|---|---|---|---|---|---|---|
| Company Name | | 31-Mar-10 Currency: | | $Locals | | Page 1 of 2 | |

| | | Ledger Account | Pending action items | | | Closed action items | |
|---|---|---|---|---|---|---|---|
| Account # | Account name | Balance | Count | Debit | Credit | Count | Amount |
| 1. Actions on Accurate Items | | | | | | | |
| 141.21 | In-transit Inventory | 1,196.00 | 0 | 745.00 | - | 2 | 445.00 |
| Total Actions on Accurate Items | | 1,196.00 | 0 | 745.00 | - | 2 | 445.00 |
| 1. Actions on Accurate Items | | | | | | | |
| 141.21 | In-transit Inventory | | 0 | 88.00 | 62.00 | 0 | - |
| Total Actions on Inaccurate Items | | | 0 | 88.00 | 62.00 | 0 | - |
| Total Action Pages | | 1,196.00 | 0 | 833.00 | 62.00 | 2 | 445.00 |

| Retention | Analyst Name | Analysis Date | Analyst Initials | Confidentiality |
|---|---|---|---|---|
| Frequency | Approver Name | Approval Date | Approv. Initials | Form ID |

| Logotype | Action Pages (AP) | | 141.21 In-transit Inventory | | | Detailed | |
|---|---|---|---|---|---|---|---|
| Company Name | | | 2-Apr-10 Currency: | | $Locals | Page 1 of 1 | |
| | | | 2 | | | | |
| Date | Action# | Action Description | X-Ref | Debit | Credit | Closed | Initials |
| 1. Actions on Accurate Items | | | | | | | |
| | | | | 200.00 | | 1 | |
| 2-Feb-10 | 20 | Follow-up on letter sent on January 5th to Eric | 08-xxxxxxxxxx8 | 245.00 | | 2-Mar-10 | |
| | | | | 300.00 | | | |
| Total Accurate Items | | | 1 | 745.00 | - | 2 | 445 |
| 2. Actions on Inaccurate Items | | | | | | | |
| 4-Mar-10 | 21 | Meet L&D's Chris to understand new process | 12-xxxxxxxxxx3 | 20.00 | | | |
| 5-Mar-10 | 22 | Meet L&D's Chris to understand new process | 13-xxxxxxxxxx4 | | 21.00 | | |
| 6-Mar-10 | 23 | Meet L&D's Chris to understand new process | 14-xxxxxxxxxx5 | 30.00 | | | |
| 7-Mar-10 | 24 | Meet L&D's Chris to understand new process | 15-xxxxxxxxxx6 | | 5.00 | | |
| 8-Mar-10 | 25 | Validate vendor's invoice number | 16-xxxxxxxxxx7 | 38.00 | | | |
| 9-Mar-10 | 26 | Check original Journal Entry | 17-xxxxxxxxxx8 | | 36.00 | | |
| Total Inaccurate Items | | | 6 | 38.00 | 62.00 | 0 | 0 |
| Total Reconciliation Sheet | | | 7 | 833.00 | 62.00 | 2 | 445 |

| Retention | Analyst Name | | Analysis Date | Analysis Initials | Confidentiality |
|---|---|---|---|---|---|
| Frequency = M | Approver Name | | Approv. Date | Approv. Initials | Form ID |

| Logotype | | | Reconciliation Control Sheet (CS) | | | | |
|---|---|---|---|---|---|---|---|
| Company Name | | | Reporting Period: | 31-Mar-10 Currency: | $Locals | Page 1 of 1 | |
| 1 | 2 | 3 | 5 | 5 | 6 | 7 | 8 |
| Account # Account Name | | Freq. | GL Balance | Inaccurate Outstanding Items | | | |
| | | | | Debit | Credit | Gross | Net D/(C) | Count |

| Account # | Account Name | Freq. | GL Balance | Debit | Credit | Gross | Net D/(C) | Count |
|---|---|---|---|---|---|---|---|---|
| 111.11 | Cash and Banks | M | 1,000.00 | 45.00 | 60.00 | 105.00 | (15.00) | 6 |
| 141.11 | Raw Material | M | 2,406.00 | 36.00 | 20.00 | 56.00 | 16.00 | 11 |
| 141.21 | In-transit Inventory | M | 1,226.00 | 88.00 | 62.00 | 150.00 | 26.00 | 6 |
| 161.11 | Fixed Assets - Cost | Q | 20,000.00 | - | 2,000.00 | 2,000.00 | (2,000.00) | 1 |
| 171.11 | Investments | Q | 2,300.00 | - | - | - | - | 0 |
| 211.11 | Loans | M | (1,650.00) | - | 130.00 | 130.00 | (130.00) | 4 |
| 221.12 | Foreign Accounts Payable | Q | (2,270.00) | 2,300.00 | 2,420.00 | 4,720.00 | (120.00) | 8 |
| 261.11 | Inter-affiliates accounts | M | (2,150.00) | 138.00 | 215.00 | 353.00 | (77.00) | 2 |
| 311.11 | Capital | A | (20,600.00) | - | 5,600.00 | 5,600.00 | (5,600.00) | 4 |
| 312.11 | Additional paid in capital | A | (125.00) | | | - | - | |
| 313.11 | Retained earnings | A | (6,550.00) | | | - | - | |
| Total Reconciliation Control Sheet | | 11 | 60,277.00 | 2,607.00 | 10,507.00 | 13,114.00 | 7,984.00 | 42 |

| Retention | Processor Name | Proc. Initials | | Proc. Date | Confidentiality |
|---|---|---|---|---|---|
| Frequency = M | Approver Name | Approv. Initials | | Approv. Date | Form ID |

Management Analysis and Reports

Accuracy and Impact Analysis

The accuracy portion of this analysis shows how strong is your reconciliation process and how accurate is your record keeping process. It emphasizes the existence of an inaccurate item irrespective of its signal.

The impact portion of this analysis shows the potential effects in the P&L statement. If net total is a debit, there is a potential negative impact in P&L. Conversely, if the net total is a credit the potential impact in P&L is positive.

| Logotype | | | Accuracy and Impact Analysis | | | | | | |
|---|---|---|---|---|---|---|---|---|---|
| Company Name | | Date: | 30-Mar-10 | | Currency: | $Locals | ($K) | Page nn of nn | |
| 1 | | 2 | 5 | 4 | 5 | 6 | 7 | 8 | 9 | 10 |
| Account # | Account Name | Account Balance | Outstanding Items | Inaccurate Outstanding Items | | | | | |
| | | | | Gross | Net | # of Items | Gross % | net % | Items % |
| 111.11 | Cash and Banks | 1,000 | 38 | 105 | (15) | 6 | 11% | -2% | 16% |
| 141.11 | Raw Material | 2,406 | 61 | 56 | 16 | 11 | 2% | 1% | 18% |
| 141.21 | In-transit Inventory | 1,226 | 11 | 150 | 26 | 6 | 12% | 2% | 55% |
| 161.11 | Fixed Assets - Cost | 20,000 | 16 | 2,000 | (2,000) | 1 | 10% | -10% | 6% |
| 171.11 | Investments | 2,300 | 8 | - | - | 0 | 0% | 0% | 0% |
| 211.11 | Loans | (1,650) | 12 | 130 | (130) | 4 | 8% | 8% | 33% |
| 221.12 | Foreign Accounts Payable | (2,270) | 45 | 4,720 | (120) | 8 | 208% | 5% | 18% |
| 261.11 | Inter-affiliates accounts | (2,150) | 25 | 353 | (77) | 2 | 16% | 4% | 8% |
| 311.11 | Capital | (20,600) | 6 | 5,600 | (5,600) | 4 | 27% | 27% | 67% |
| 312.11 | Additional paid in capital | (125) | 0 | - | - | 0 | 0% | 0% | |
| 313.11 | Retained earnings | (6,500) | 0 | - | - | 0 | 0% | 0% | |
| Group Total | | 60,277 | 222 | 13,114 | 7,984 | 42 | 22% | 13% | 19% |
| Retention Frequency = M | | Analyst Name | | Analysis Date | | Analyst Initials | | Confidentiality Form ID | |

Accuracy Trend

It presents a trend that shows to where the accuracy is heading.

It reflects periods with tighter/looser control, better/worse automated accounting process, and strong/weak chart of accounts suitability for reconciliation.

| Logotype | | | Accuracy Trend (Gross) | | | | | | |
|---|---|---|---|---|---|---|---|---|---|
| Company Name | | Date: | 30-Mar-10 | | Currency: | $Locals | | Page nn of nn | |
| Account # | Account Name | Mo. 01 - Inaccurate | | Mo. 02 - Inaccurate | | Mo. 03 - Inaccurate | | Mo. 04 - Inaccurate | |
| | | Balance % | Items % | Balance % | Items % | Balance % | Items % | Balance % | Items % |
| 111.11 | Cash and Banks | 17% | 15% | 15% | 17% | 11% | 15% | 10% | 13% |
| 141.11 | Raw Material | 4% | 12% | 9% | 5% | 7% | 5% | 4% | 12% |
| 141.21 | In-transit Inventory | 10% | 13% | 6% | 17% | 8% | 17% | 6% | 10% |
| 161.11 | Fixed Assets - Cost | 11% | 15% | 11% | 14% | 11% | 14% | 8% | 11% |
| 171.11 | Investments | | | | | | | | |
| 211.11 | Loans | 14% | 13% | 9% | 13% | 10% | 10% | 11% | 7% |
| 221.12 | Foreign Accounts Payable | 12% | 17% | 14% | 15% | 10% | 15% | 7% | 13% |
| 261.11 | Inter-affiliates accounts | 3% | 15% | 7% | 13% | 4% | 9% | 4% | 17% |
| 311.11 | Capital | 1% | 1% | 1% | 1% | 0% | 0% | 0% | 0% |
| 312.11 | Additional paid in capital | | | | | | | | |
| 313.11 | Retained earnings | | | | | | | | |
| Account Group Total | | 9% | 13% | 9% | 12% | 8% | 11% | 6% | 10% |
| Retention Frequency = M | | Analyst Name | | Analysis Date | | Analyst Initials | | Confidentiality Form ID | |

Impact Trend

It is similar to the accuracy Reports, but it shows net amount.

If it shows an increasing trend, it may be the indication of a potential negative impact in Income statement. Conversely, if outstanding totals are decreasing it shows that the potential impacts are being absorbed.

| Logotype | | Impact Trend (Net) | | | | | | |
|---|---|---|---|---|---|---|---|---|
| Company Name | | Date: 30-Mar-10 | | | Currency: $Locals | | Page nn of nn | |
| Account # Account Name | | % of Net Inaccurate Balances | | | | | | |
| | | Mo. 01 | Mo. 02 | Mo. 03 | Mo. 04 | Mo. 05 | Mo. 06 | 3 Mo. Ave. | 6 Mo. Ave. |
| 111.11 | Cash and Banks | 8% | 7% | 5% | 5% | 4% | 2% | 4% | 5% |
| 141.11 | Raw Material | 2% | 5% | 3% | 2% | 2% | 1% | 2% | 3% |
| 141.21 | In-transit Inventory | 9% | 5% | 7% | 5% | 3% | 3% | 4% | 5% |
| 161.11 | Fixed Assets - Cost | 5% | 4% | 3% | 3% | 2% | 1% | 2% | 3% |
| 171.11 | Investments | | | | | | | | |
| 211.11 | Loans | 4% | 3% | 3% | 3% | 3% | 2% | 3% | 3% |
| 221.12 | Foreign Accounts Payable | 1% | 1% | 1% | 1% | 0% | 0% | 0% | 1% |
| 261.11 | Inter-affiliates accounts | 2% | 4% | 3% | 3% | 1% | 1% | 2% | 2% |
| 311.11 | Capital | 0% | 0% | 0% | 0% | 0% | 0% | 0% | 0% |
| 312.11 | Additional paid in capital | | | | | | | | |
| 313.11 | Retained earnings | | | | | | | | |
| Account Group Total | | 4% | 3.7% | 3.3% | 2.7% | 1.9% | 1.4% | 2.0% | 2.8% |
| Retention Frequency = M | | Analyst Name | | Analysis Date | | Analyst Initials | | Confidentiality Form ID | |

Inaccurate Items Aging

It is the tabulation of inaccurate items (INIT) based on how old their existence is. INIT existence days are the difference between the INIT found day, and current GL cut off date. In order to be accurate, determine the weighted average aging from each individual outstanding item, not from totals.

An INIT disappear from the aging report, only when its corrective actions have been posted to GL, or it is now a fully identified item. Sometimes, the INIT can disappear, but the root cause that has generated it, it is still not eradicated. Therefore, next month another adjustment corrective entry will happen.

The aging report shows amounts and quantity of INIT items.

A high aging report usually is related to lack of resources, or improper focus geared toward the fresher INIT, or a faulty accounting process.

| Logotype Company Name | | Date: | Inaccurate Items Aging 30-Mar-10 | | Currency: | $Locals | ($K) | Page nn of nn | |
|---|---|---|---|---|---|---|---|---|---|
| Account # | Account Name | Account Balance | Net Inaccurate Balances | | | | | | |
| | | | dd<30 | 31<dd<60 | 61<dd<90 | 91<dd<180 | 181<dd<365 | dd>365 | Total |
| 111.11 | Cash and Banks | 1,000 | 87 | 56 | 44 | 45 | 56 | 89 | 377 |
| 141.11 | Raw Material | 2,406 | 107 | 69 | 59 | 60 | 71 | 112 | 478 |
| 141.21 | In-transit Inventory | 1,226 | 12 | 8 | 6 | 6 | 8 | 12 | 52 |
| 161.11 | Fixed Assets - Cost | 20,000 | 86 | 55 | 45 | 44 | 57 | 85 | 372 |
| 171.11 | Investments | 2,300 | | | | | | | 0 |
| 211.11 | Loans | (1,650) | 71 | 46 | 33 | 37 | 43 | 69 | 299 |
| 221.12 | Foreign Accounts Payable | (2,270) | | | | | | | 0 |
| 261.11 | Inter-affiliates accounts | (2,150) | | | | | | | 0 |
| 311.11 | Capital | (20,600) | | | | | | | 0 |
| 312.11 | Additional paid in capital | (125) | | | | | | | 0 |
| 313.11 | Retained earnings | (6,550) | | | | | | | 0 |
| Account Group Total | | (6,413) | 363 | 234 | 187 | 192 | 235 | 367 | 1,578 |

| Retention Frequency = M | Analyst Name | Analysis Date | Analyst Initials | Confidentiality Form ID |
|---|---|---|---|---|

Vertical Analysis

It shows INIT percentage or amounts by ledger account group.

It presents a graphic of the impact and accuracy for the more liquid ledger accounts toward the more stable ones. The more liquid an account is, more INIT it is expected these accounts will have.

| Logotype Company Name | | Date: | Vertical Analysis 30-Mar-10 | | Currency: | $Locals | ($K) | Page nn of nn |
|---|---|---|---|---|---|---|---|---|
| Account # | Account Name | Account Balance | Inaccurate Balances | | | | | |
| | | | Net | Gross | % of Net | % of Gross | | |
| 111.11 | Cash and Banks | 1,000 | 377 | 605 | 24% | 24% | | |
| 141.11 | Raw Material | 2,406 | 478 | 731 | 30% | 29% | | |
| 141.21 | In-transit Inventory | 1,226 | 52 | 80 | 3% | 3% | | |
| 161.11 | Fixed Assets - Cost | 20,000 | 372 | 579 | 24% | 23% | | |
| 171.11 | Investments | 2,300 | | | 0% | 0% | | |
| 211.11 | Loans | (1,650) | 299 | 496 | 19% | 20% | | |
| 221.12 | Foreign Accounts Payable | (2,270) | | | 0% | 0% | | |
| 261.11 | Inter-affiliates accounts | (2,150) | | | 0% | 0% | | |
| 311.11 | Capital | (20,600) | | | 0% | 0% | | |
| 312.11 | Additional paid in capital | (125) | | | 0% | 0% | | |
| 313.11 | Retained earnings | (6,550) | | | 0% | 0% | | |
| Account Group Total | | (6,413) | 1,578 | 2,491 | 100% | 100% | | |

| Retention Frequency = M | Analyst Name | Analysis Date | Analyst Initials | Confidentiality Form ID |
|---|---|---|---|---|

What is claimed is:

1. A system for enhancing accuracy in enterprise accounting by performing account analysis comprising:
a computing device having a processor configured to execute the following steps;
(a) extracting accounting accuracy input data from at least one database of accounting entries, wherein each accounting entry contains data pertaining to a recorded transaction from a specified reporting period;
(b) compiling inputs, wherein compiling inputs is performed by compiling at least (1) one reconciliation sheet, wherein said reconciliation sheet includes a list of outstanding items in the accounting accuracy input data from a previous reporting period where outstanding items are accounting entries that have no correspondent accounting entry, (2) one action sheet, wherein the action sheet includes an action item for every outstanding item in the accounting accuracy input data from a previous reporting period, wherein the action item details the cause of the lack of the correspondent transaction for the outstanding item, and (3) one ledger record, wherein the ledger record lists accounting entries from a current reporting period;
(c) resolving accounting entries in the accounting accuracy input data and the reconciliation sheet, wherein resolving is performed with at least one ledger record and includes linking correspondent accounting entries and identifying outstanding items in the accounting accuracy input data from the current reporting period;
(d) generating a reconciliation output, wherein said reconciliation output includes a list of outstanding items from the reconciliation sheet that were not linked in step (c) and outstanding items from the current reporting period identified in step (c);
(e) categorizing outstanding items from the current reporting period identified in step (b);
(f) revising the reconciliation output and the ledger record that lists accounting entries from a current reporting period, wherein revising includes repeating step (c) until the total of the reconciliation output equals the balance of the ledger record that lists accounting entries from a current reporting period;
(g) closing action items that correspond to accounting entries that were linked in step (c), wherein closing is performed by updating pending action items and removing linked action items; and
(h) providing an accuracy output, wherein the accuracy output comprises the reconciliation output and an action output, wherein the action output includes all action items on the action sheet and all of the outstanding items from the reconciliation output.

2. The system according to claim 1, wherein:
the step of extracting comprises extracting data from an existing last period reconciliation sheet, an existing last period action sheet, and an existing current period ledger record;
the step of compiling includes compiling a working last period reconciliation sheet by listing outstanding items from the existing last period reconciliation sheet, compiling a working last period action sheet by listing action items from the existing last period action sheet, and compiling a working current period ledger record by listing accounting entries from the existing current period ledger record;
the step of resolving includes linking outstanding items on the working last period reconciliation sheet with the working current period ledger record accounting entries and linking the working current period ledger record accounting entries with other the working current period ledger record accounting entries;
the step of generating includes creating a working current period reconciliation output using the working last period reconciliation sheet and the working current period ledger record;
the step of categorizing includes categorizing outstanding items as either performance or inaccurate items, and further categorizing any inaccurate items as excess, linking key, or unidentified;
the step of revising continues until the working current period ledger record balance equals the working current period reconciliation output total;
the step of closing includes closing and updating action items in the working last period action sheet; and
step of providing includes outputting the working current period reconciliation output and a working current period action output, wherein the working current period action output includes action items from the working last period action sheet and outstanding items from the working current period reconciliation output.

3. The system according to claim 1, wherein:
the step of extracting comprises extracting data from an existing last period reconciliation sheet, an existing last period action sheet, an existing current period activity report, an existing current period auxiliary journal, an existing current period ledger record, an existing last period auxiliary ledger, and an existing current period auxiliary ledger;
the step of compiling includes compiling a working last period reconciliation sheet by listing outstanding items from the existing last period reconciliation sheet, compiling a working last period action sheet by listing action items from the existing last period action sheet, and compiling a working current period ledger record by listing accounting entries from the existing current period ledger record;
the step of compiling additionally includes compiling a working current period activity report with data from the existing current period activity report, a working current period auxiliary journal with data from the existing current period auxiliary journal, a working last period auxiliary ledger with data from the existing last period auxiliary ledger LPAL, and a working current period auxiliary ledger with data from the existing current period auxiliary ledger;
the step of resolving includes linking non-auxiliary ledger outstanding items on a working last period reconciliation sheet against entries from a working current period ledger record and designating working current period ledger record adjustment accounting entries that correct system related discrepancies, identifying the remaining unlinked working current period ledger record entries from the non-auxiliary ledgers and linking those entries against each other, identifying and correcting internal discrepancies related to any automated system, comparing the working current period activity report against the working current period auxiliary journal, comparing working current period auxiliary journal net account totals against equivalent totals in each Journal Entry ledger account, determining the general ledger internal systems consistency linking procedure, and reconciling transactions between the more than one auxiliary ledger and any ledger account;

the step of generating includes creating a working current period reconciliation output using the working last period reconciliation sheet and the working current period ledger record;

the step of categorizing includes the categorizing outstanding items as either performance or inaccurate items, and further categorizing any inaccurate items as excess, linking key, or unidentified;

the step of revising includes comparing totals of the working current period reconciliation output to the working current period ledger record, where if the working current period reconciliation output and working current period ledger record totals do not match, repeating the step of resolving until the discrepancy is identified and corrected;

the step of closing includes closing action items in the working last period action sheet; and the step of providing includes outputting the working current period reconciliation output and a working current period action output, wherein the working current period action output includes action items from a working last period action sheet and outstanding items from the working current period reconciliation output.

4. The system according to claim 1, wherein:

the step of extracting comprises extracting data from an existing last period reconciliation sheet, an existing last period action sheet, an existing current period ledger record, an existing current period statement of accounts, and an existing current period activity report;

the step of compiling includes compiling a working last period reconciliation sheet by listing outstanding items from the existing last period reconciliation sheet, compiling a working last period action sheet by listing action items from the existing last period action sheet, and compiling a working current period ledger record by listing accounting entries from the existing current period ledger record;

the step of compiling additionally includes compiling a working current period statement of accounts with data from the existing current period statement of accounts and a working current period activity report with data from the existing current period activity report;

the step of resolving includes linking outstanding items from the working last period reconciliation sheet against entries in the working current period statement of accounts, linking outstanding items from the working last period reconciliation sheet against entries in the working current period ledger record, linking working current period ledger record entries against working current period statement of accounts entries, and linking working current period ledger record entries against working current period ledger record entries;

the step of generating includes creating a working current period reconciliation sheet using the working last period reconciliation sheet and the working current period ledger record;

the step of categorizing outstanding items further includes identifying clarification actions and information seeking actions;

the step of revising includes comparing totals of the working current period reconciliation sheet to the working current period ledger record, where if the working current period reconciliation sheet and working current period ledger record totals do not match, repeating the step of resolving until the discrepancy is identified and corrected;

the step of closing includes closing action items in the working last period action sheet; and the step of providing includes outputting the working current period reconciliation sheet and a working current period action sheet, wherein the working current period action sheet includes action items from the working last period action sheet, and outstanding items from the working current period reconciliation sheet.

5. The system according to claim 1, wherein:

the step of extracting comprises extracting data from an existing last period reconciliation sheet, an existing last period action sheet, an existing current period ledger record, and an existing current period external reference;

the step of compiling includes compiling a working last period reconciliation sheet by listing outstanding items from the existing last period reconciliation sheet, compiling a working last period action sheet by listing action items from the existing last period action sheet LPAP, and compiling a working current period ledger record by listing accounting entries from the existing current period ledger record;

the step of compiling additionally includes compiling a working current period external reference with data from the existing current period external reference;

the step of resolving additionally includes determining an interim current period reconciliation sheet and current period action sheet for linking purposes, linking the interim current period reconciliation sheet external reference accurate items against the existing current period external reference; linking the interim current period reconciliation sheet external reference inaccurate items against the existing current period external reference; and linking the general ledger adjustment entries of the existing current period reconciliation sheet against variations between the external reference and general ledger columns;

the step of generating includes creating a working current period reconciliation sheet by updating interim current period reconciliation sheet with internal inaccurate and accurate items on each respective section and adding new external reference inaccurate entries to the external reference outstanding items section;

the step of categorizing includes the categorizing outstanding items as either performance or inaccurate items, and further categorizing any inaccurate items as excess, linking key, or unidentified;

the step of revising continues until the working current period ledger record balance equals the working current period reconciliation sheet total;

the step of closing includes closing action items in the working last period action sheet; and step of providing includes outputting the working current period reconciliation sheet and a working current period action sheet, wherein the working current period action sheet includes action items from the working last period action sheet, and outstanding items from the working current period reconciliation sheet.

6. The system according to claim 1, wherein:

the step of extracting comprises extracting data from a first existing last period reconciliation sheet, a first existing last period action sheet and a first existing current period ledger record, wherein the first existing last period reconciliation sheet, first existing current period ledger record, and first existing current period ledger record are from a first entity, an second existing last period reconciliation sheet, an second existing last period action sheet, and a second existing current period ledger record, wherein the second existing last period reconciliation sheet, second existing current period ledger record, and second existing current period ledger record are from a second entity;

the step of compiling includes compiling a working last period reconciliation sheet by listing outstanding items from the first existing last period reconciliation sheet, compiling a first working last period action sheet by listing action items from the first existing last period action sheet, and compiling a first working current period ledger record by listing accounting entries from the first existing current period ledger record;

the step of compiling additionally includes compiling a second working current period ledger record by listing accounting entries from the second existing current period ledger record;

the step of resolving includes linking the first working last period reconciliation sheet outstanding items with the first working current period ledger record entries, linking unlinked first working current period ledger record entries with unlinked second working current period ledger record entries, linking unlinked first working current period ledger record entries with unlinked first working current period ledger record entries, linking unlinked second working current period ledger record entries with unlinked second working current period ledger record entries, and cross checking first working current period ledger record with second working current period ledger record;

the step of generating includes creating a working current period reconciliation output using the first working last period reconciliation sheet and the working current period reconciliation output, any new outstanding items from the first working current period ledger record discovered during the linking processes to the working current period reconciliation output, and any new outstanding items from the second working current period ledger record discovered during the linking processes;

the step of categorizing includes the categorizing outstanding items as either performance or inaccurate items, and further categorizing any inaccurate items as excess, linking key, or unidentified;

the step of revising includes comparing totals of the working current period reconciliation output to the first working current period ledger record and the second working current period ledger record, where if the total from the working current period reconciliation output, first working current period ledger record, and second working current period ledger record do not match, repeating the step of resolving outstanding items until the discrepancy is identified and corrected;

the step of closing includes closing action items in the first working last period action sheet; and the step of providing includes outputting the working current period reconciliation output and a working current period action output, wherein the working current period action output includes action items from the first working last period action sheet and outstanding items from the working current period reconciliation output.

7. The system according to claim 1, wherein:

the step of extracting comprises extracting data from an existing last period reconciliation sheet, an existing last period action sheet, an existing current period ledger record and an existing current period historical ledger;

the step of compiling includes compiling a working last period reconciliation sheet by listing outstanding items from the existing last period reconciliation sheet, compiling a working last period action sheet by listing action items from the existing last period action sheet, and compiling a working current period ledger record by listing accounting entries from the existing current period ledger record;

the step of compiling additionally includes compiling a working current period historical ledger with data from the existing current period historical ledger;

the step of resolving includes linking the working last period reconciliation sheet outstanding items with the working current period ledger record entries, linking the equity balance on the working current period ledger record against the totals of the working current period historical ledger, comparing the total in each historical ledger sheet against the respective equity account balance, and linking unlinked working current period ledger record entries with unlinked working current period ledger record entries;

the step of generating includes creating a working current period reconciliation sheet by listing all unlinked outstanding items discovered during the linking of the working last period reconciliation sheet LPRS7 outstanding items with the working current period ledger record entries and any new outstanding items discovered during the linking of the equity balance on the working current period ledger record against the totals of the working current period historical ledger;

the step of categorizing includes the categorizing outstanding items as either performance or inaccurate items, and further categorizing any inaccurate items as excess, linking key, or unidentified;

the step of revising includes comparing totals of the working current period reconciliation sheet to the working current period ledger record, where if the total from the working current period reconciliation sheet and the working current period ledger record do not match, repeating the step of resolving outstanding items until the discrepancy is identified and corrected;

the step of closing includes closing action items in the working last period action sheet; and the step of providing includes outputting the working current period reconciliation sheet and a working current period action sheet, wherein the working current period action sheet includes action items from the working last period action sheet and outstanding items from the working current period reconciliation sheet.

8. The system according to claim 1, wherein:

the step of extracting comprises extracting data from a first existing last period reconciliation sheet, an existing current period statement of accounts, an existing current period external reference, an existing current period auxiliary ledger, a first existing last period action sheet and a first existing current period general ledger in a first currency and a second existing last period reconciliation sheet, a second existing last period action sheet and a second existing current period general ledger in a second currency;

the step of compiling includes compiling a first working last period reconciliation sheet by listing outstanding items from the first existing last period reconciliation sheet in the first currency, compiling a first working last period action sheet by listing action items from the first existing last period action sheet in the first currency, and compiling a first working current period general ledger by listing accounting entries from the first existing current period general ledger in the first currency;

the step of compiling additionally includes compiling a second working last period reconciliation sheet by listing outstanding items from the second existing last period reconciliation sheet in the second currency, compiling a second working last period action sheet by listing action items from the second existing last period action sheet in the second currency, and compiling a second working current period general ledger by listing accounting entries from the second existing current period general ledger in the second currency;

the step of resolving includes linking outstanding items on the first working last period reconciliation sheet with first working current period general ledger accounting entries and linking first working current period general ledger accounting entries with other first working current period general ledger accounting entries;

the step of resolving additionally includes linking outstanding items on the second working last period reconciliation sheet with second working current period general ledger accounting entries and linking second working current period general ledger accounting entries with other second working current period general ledger accounting entries;

the step of generating includes creating a first interim reconciliation sheet using the first working last period reconciliation sheet and a working current period reconciliation sheet, and creating a second interim reconciliation sheet using the second working last period reconciliation sheet and the working current period reconciliation sheet;

the step of resolving additionally includes linking outstanding items on the first interim reconciliation sheet with outstanding items on the second interim reconciliation sheet;

the step of generating additionally includes compiling the working current period reconciliation sheet using the first interim reconciliation sheet and the second interim reconciliation sheet;

the step of closing includes closing action items in the first working last period action sheet and the second working last period action sheet; and step of providing includes outputting the working current period reconciliation sheet and a working current period action sheet, wherein the working current period action sheet includes action items from the first working last period action sheet, action items from the second working last period action sheet, and outstanding items from the working current period reconciliation sheet.

9. A system for enhancing accuracy in enterprise accounting by performing account analysis comprising:

a computing device having a processor configured to execute the following steps;

extracting accounting accuracy input data from an existing last period historical ledger an existing current period general ledger, and an existing shareholder events, wherein the existing last period historical ledger comprises an existing last period historical ledger for capital, an existing last period historical ledger for dividends, an existing last period historical ledger for reevaluation, and an existing last period historical ledger for net income;

compiling inputs, wherein compiling inputs is performed by compiling a working last period historical ledger for capital by listing entries from the existing last period historical ledger for capital, compiling a working last period historical ledger for dividends by listing entries from the existing last period historical ledger for dividends, compiling a working last period historical ledger for reevaluation by listing entries from the existing last period historical ledger for reevaluation, compiling a working last period historical ledger for net income by listing entries from the existing last period historical ledger for net income, compiling a working current period general ledger by listing entries from the existing current period general ledger;

filling a working current period historical ledger quarterly with data from a working last period historical ledger, wherein the working last period historical ledger comprises the working last period historical ledger for capital, working last period historical ledger for dividends, working last period historical ledger for reevaluation, and working last period historical ledger for net income; and adding a net income entry for the respective quarter to a working current period historical ledger for net income;

filling annually the working current period historical ledger with data from working last period historical ledger, wherein the working last period historical ledger comprises the working last period historical ledger for capital, working last period historical ledger for dividends, working last period historical ledger for reevaluation, and working last period historical ledger for net income and adding the net income entry for the respective year to the working current period historical ledger for net income;

posting to the working current period general ledger, wherein the step of posting includes posting the working current period historical ledger data, which comprises a working current period historical ledger for capital, working current period historical ledger for dividends, working current period historical ledger for reevaluation, and working current period historical ledger for net income data to the working current period general ledger, posting the net income equivalent journal entry to the working current period general ledger; and revising, where revising comprises copying the final balance of working current period historical ledger for capital, working current period historical ledger for dividends, working current period historical ledger for reevaluation, and working current period historical ledger for net income onto a historical summary sheet and copying the current balance of working current period general ledger onto the historical summary sheet; and comparing the two reconciled balances for working current period historical ledger and working current period general ledger until they are equal;

providing the working current period historical ledger, which comprises working current period historical ledger for capital, working current period historical ledger for dividends, working current period historical ledger for reevaluation, and working current period historical ledger for net income, wherein providing includes outputting the working current period historical ledger for capital, working current period historical ledger for dividends, working current period historical ledger for reevaluation, and working current period historical ledger for net income.

10. A system for enhancing accuracy in enterprise accounting by performing account analysis comprising:

a computing device having a processor configured to execute the following steps;

extracting first working current period balance sheet input data and first working current period income statement input data from a first existing current period balance sheet and a first existing current period income statement, wherein the existing current period balance sheet and existing current period income statement comprise a Balance Sheet and Income Statement in Currency A, respectively;

extracting second working current period balance sheet input data and second working current period income statement input data from a second existing current period balance sheet and a second existing current period income statement, wherein the second existing current period balance sheet and second existing current period income statement comprise a Balance Sheet and Income Statement in Currency B, respectively;

extracting action item input data from an existing last period action page;

wherein a working last period action page and a working current period action page are provided;

compiling a first working profit-before-taxes from said first working current period income statement input data;

compiling a first working Ledger from said first working current period balance sheet input data and first working current period income statement input data, wherein said first working Ledger includes the first working profit-before-taxes;

compiling a second working profit-before-taxes from said second working current period income statement input data;

compiling a second working Ledger from said second working current period balance sheet input data and second working current period income statement input data, wherein said second working Ledger includes the second working profit-before-taxes;

compiling the working last period action page from the action item input data, where the action item input data includes an action item for every discrepant item in the accounting accuracy input data from a previous reporting period, wherein the action item details the cause for significant variations between the first working profit-before-taxes and second working profit-before-taxes;

wherein the first working current period balance sheet and the first working current period income statement are from the same reporting period and denoted in a different currency and subject to different generally accepted accounting principles than the second working current period balance sheet and the second working current period income statement;

processing a list of uncommon categories and a list of common categories, wherein uncommon categories are generally accepted accounting principles that are inconsistent between the first working current period balance sheet and the first working current period income statement and the second working current period balance sheet and the second working current period income statement and common categories are generally accepted accounting principles that are common to the first working current period balance sheet and the first working current period income statement and the second working current period balance sheet and the second working current period income statement but apply different criteria;

filling the amounts of uncommon categories to the first working Ledger and the second working Ledger in a Schedule A;

copying amounts of common categories to the first working Ledger and the second working Ledger in a Schedule B;

copying the first working profit-before-taxes, the second working profit-before-taxes, and amounts from schedule A and schedule B to the schedule C;

converting the first working profit-before-taxes to the currency used in the second working profit-before-taxes using the average exchange rate for the current period;

comparing the causal for the percentage variation between the consistent first working profit-before-taxes and second working profit-before-taxes from the two ledgers using a Schedule D; while comparing (reviewing) includes repeating steps of filling, copying, and converting (resolving) until the variation falls under an acceptable level.

closing action items from working last period action page, wherein closing is performed by updating pending action items and removing action items that minimize or eliminate discrepancies;

copying any action items not closed from working last period action page to the working current period action page, and adding new action items from a working current period reconciliation sheet to the working current period action page; and providing an output, wherein the output includes the Schedule D and the working current period action page.

* * * * *